US011895656B2

(12) United States Patent
Matsumura et al.

(10) Patent No.: US 11,895,656 B2
(45) Date of Patent: Feb. 6, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/488,305

(22) PCT Filed: Feb. 23, 2018

(86) PCT No.: PCT/JP2018/006659
§ 371 (c)(1),
(2) Date: Aug. 23, 2019

(87) PCT Pub. No.: WO2018/155619
PCT Pub. Date: Aug. 30, 2018

(65) Prior Publication Data
US 2020/0236700 A1 Jul. 23, 2020

(30) Foreign Application Priority Data
Feb. 24, 2017 (JP) ................................. 2017-033355

(51) Int. Cl.
*H04W 72/21* (2023.01)
*H04L 5/00* (2006.01)

(52) U.S. Cl.
CPC .......... *H04W 72/21* (2023.01); *H04L 5/0007* (2013.01); *H04L 5/0053* (2013.01)

(58) Field of Classification Search
USPC ......................................................... 370/330
See application file for complete search history.

(56) References Cited

U.S. PATENT DOCUMENTS

| 2017/0163388 | A1* | 6/2017 | Wiemann | H04L 1/1887 |
| 2017/0164352 | A1* | 6/2017 | Yang | H04W 72/21 |
| 2018/0132264 | A1* | 5/2018 | Jung | H04L 1/1854 |
| 2018/0199367 | A1* | 7/2018 | Jung | H04W 72/23 |
| 2018/0227949 | A1* | 8/2018 | Tiirola | H04L 27/26035 |

OTHER PUBLICATIONS

3GPP TSG RAN WG1 #88, R1-1702983, Feb. 7, 2017 (Year: 2017).*

(Continued)

*Primary Examiner* — Jeffrey M Rutkowski
*Assistant Examiner* — Luna Weissberger
(74) *Attorney, Agent, or Firm* — Osha Bergman Watanabe & Burton LLP

(57) ABSTRACT

The present invention is designed so that, even when a sequence-based uplink control channel is used, uplink control information is reported appropriately. A user terminal according to one aspect of the present invention has a control section that determines to use one or both of a short uplink control channel, which is transmitted in a short period, and a long uplink control channel, which is transmitted in a longer period than the short uplink control channel, based on certain information, and a transmission section that transmits the uplink control information using the determined uplink control channel.

4 Claims, 18 Drawing Sheets

(56) References Cited

OTHER PUBLICATIONS

International Search Report issued in Application No. PCT/JP2018/006659, dated May 15, 2018 (3 pages).
Written Opinion issued in International Application No. PCT/JP2018/006659, dated May 15, 2018 (3 pages).
3GPP TS 36.300 V8.12.0; "LTE; Evolved Universal Terrestrial Radio Access (E-UTRA) and Evolved Universal Terrestrial Radio Access Network (E-UTRAN); Overall description; Stage 2 (Release 8)" Apr. 2010, (153 pages).
Extended European Search Report issued in counterpart European Patent Application No. 18757301.9, dated Nov. 5, 2020 (7 pages).
Guangdong OPPO Mobile Telecom; "On duration aspects of NR PUCCH with long duration"; 3GPP TSG RAN WG1 meeting #88, R1-1701956; Athens, Greece, Feb. 13-17, 2017 (5 pages).
LG Electronics; "Overall structure of UL control channel for NR"; 3GPP TSG RAN WG1 Meeting #87, R1-1611840; Reno, USA, Nov. 14-18, 2016 (6 pages).
Office Action in counterpart Japanese Patent Application No. 2019-501829 dated Mar. 8, 2022 (6 pages).
H. Huawei; "Resource indication of UL control channel"; 3GPP TSG RAN WG1 Meeting #88, R1-1701648; Athens, Greece; Feb. 13-17, 2017 (4 pages).
H. Huawei; "Resource allocation of UL control channel"; 3GPP TSG RAN WG1 NR Ad-Hoc Meeting, R1-1700018; Spokane, USA; Jan. 16-20, 2017 (4 pages).
ZTE; "NR UL control channel structure"; 3GPP TSG RAN WG1 Meeting #87, R1-1611291; Reno, USA; Nov. 14-18, 2016 (7 pages).
ZTE et al.; "sPUCCH format design"; 3GPP TSG RAN WG1 Meeting #88, R1-1701973; Athens, Greece; Feb. 13-17, 2017 (6 pages).
NTT Docomo, Inc.; "DMRS-based vs. Sequence-based PUCCH in short duration"; 3GPP TSG RAN WG1 Meeting #88, R1-1702811; Athens, Greece; Feb. 13-17, 2017 (9 pages).
Office Action in counterpart Chinese Patent Application No. 201880026955.0 dated Feb. 17, 2023 (14 pages).

\* cited by examiner

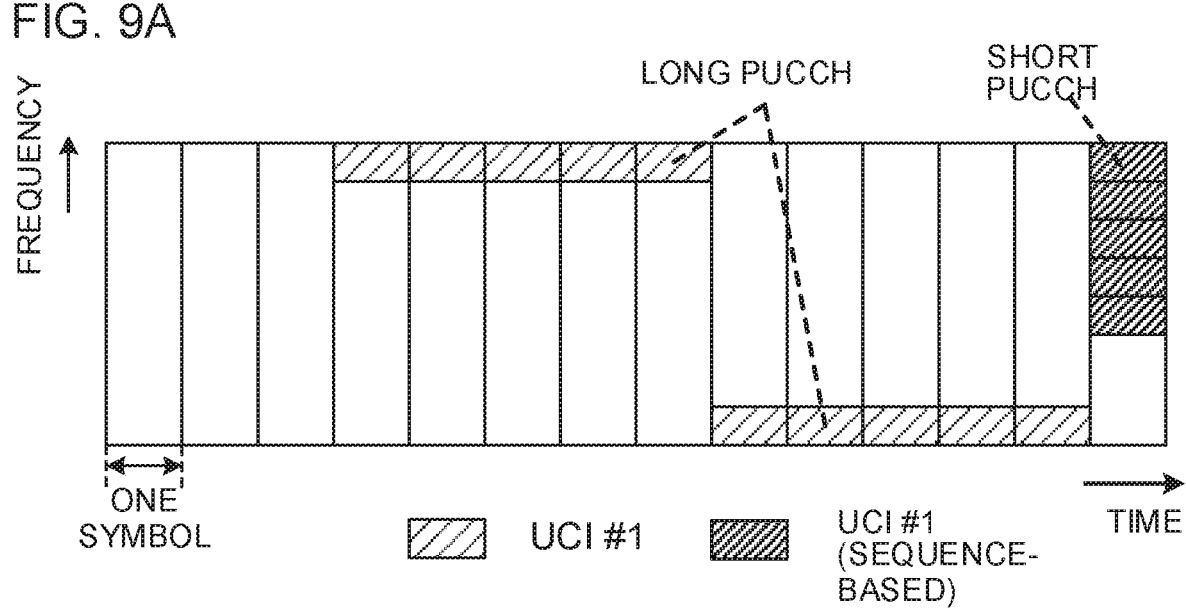
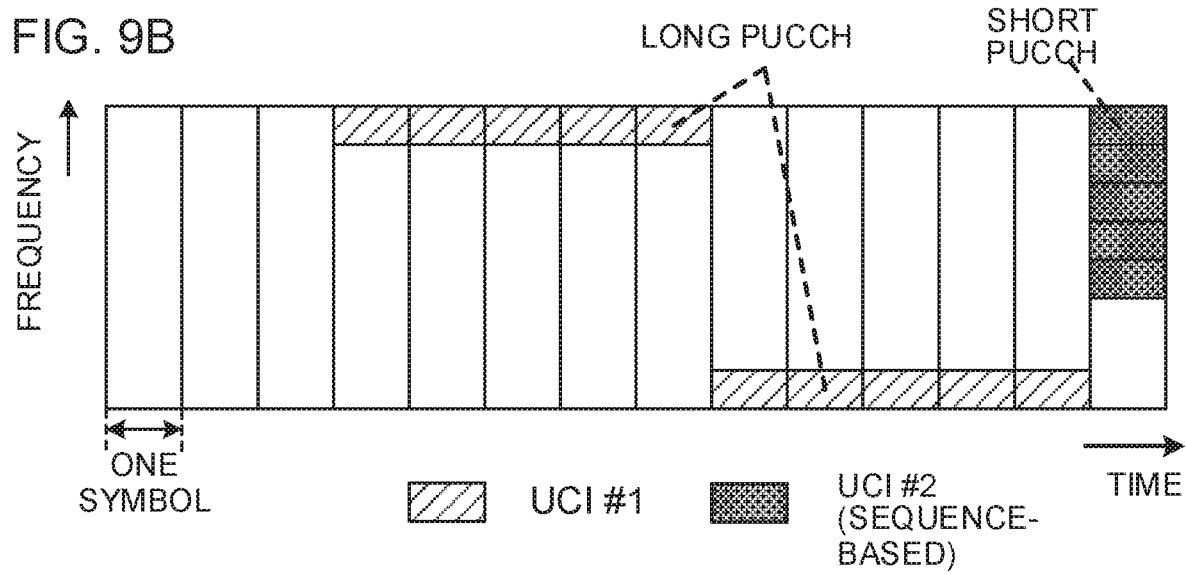

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

Also, in existing LTE systems (for example, LTE Rel. 8 to 13), a user terminal (UE: User Equipment) transmits uplink control information (UCI) by using uplink control channels (for example, PUCCH: Physical Uplink Control CHannel) and/or uplink data channels (for example, PUSCH: Physical Uplink Shared CHannel). The format of these uplink controls channel is referred to as "PUCCH format" and so on.

UCI includes at least one of a scheduling request (SR), retransmission control information in response to DL data (DL data channel (PDSCH: Physical Downlink Shared CHannel)) (also referred to as "HARQ-ACK (Hybrid Automatic Repeat reQuest-Acknowledgement)," "ACK," "NACK (Negative ACK)" and so on) and channel state information (CSI).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Meanwhile, in NR, a study is in progress to use a plurality of PUCCHs comprised of different numbers of symbols. However, how to use these PUCCHs properly has not been studied yet. Failure to transmit UCI using an appropriate PUCCH may lead to a deterioration of communication throughput, spectral efficiency, and so on.

The present invention has been made in view of the above, and it is therefore one of the objects of the present invention to provide a user terminal and radio communication method that can report UCI appropriately even when a plurality of PUCCHs comprised of different numbers of symbols are used.

Solution to Problem

According to one aspect of the present invention, a user terminal has a control section that determines to use one or both of a short uplink control channel, which is transmitted in a short period, and a long uplink control channel, which is transmitted in a longer period than the short uplink control channel, based on certain information, and a transmission section that transmits the uplink control information using the determined uplink control channel.

Advantageous Effects of Invention

According to the present invention, even when a plurality of PUCCHs comprised of different numbers of symbols are used, UCI can be reported appropriately.

BRIEF DESCRIPTION OF DRAWINGS

FIGS. 9A and 9B are diagrams to show examples of UCIs when using sequence-based PUCCH for short PUCCH of PUCCH type 3;

DESCRIPTION OF EMBODIMENTS

Figure 1:
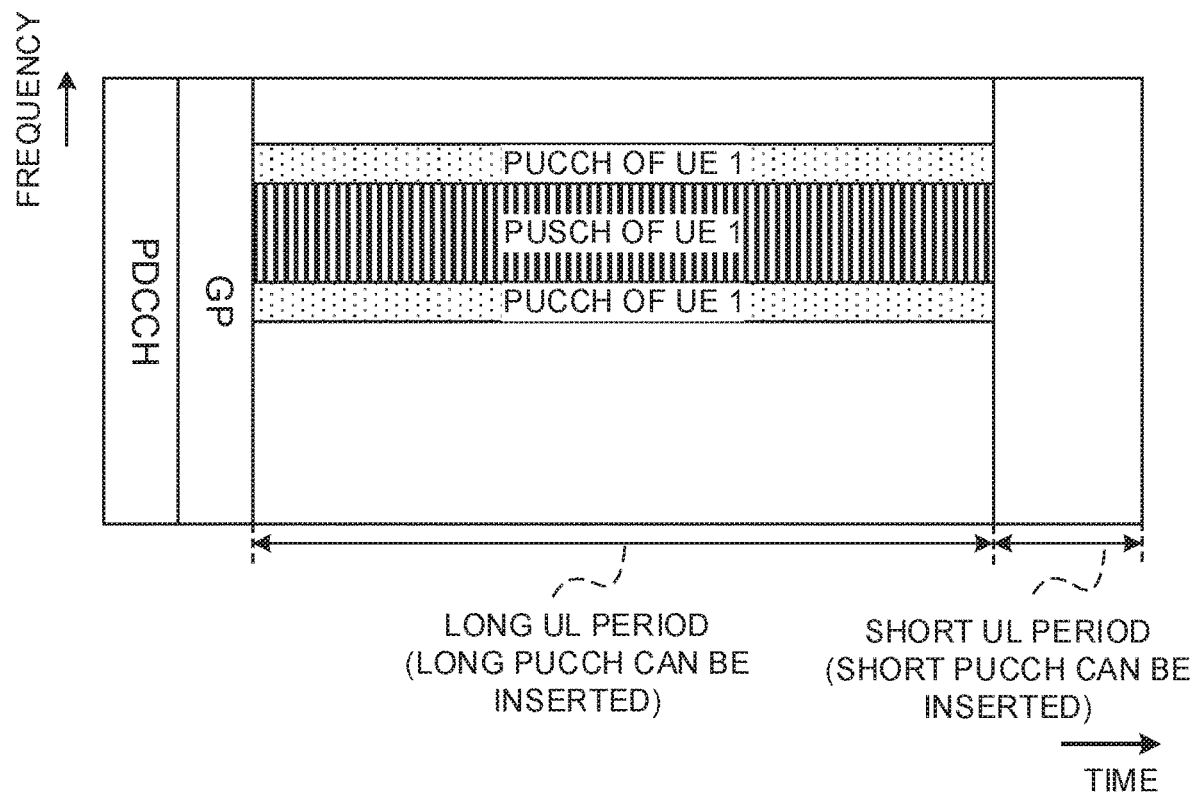
FIG. 1 is a diagram to show an example of NR slot resource mapping.

Future radio communication systems (for example, LTE Rel. 14, 15 and/or later versions, 5G, NR, etc.) are under study to introduce multiple numerologies, not a single numerology.

Here, a numerology may refer to a set of communication parameters that characterize the design of signals in a given RAT (Radio Access Technology), the design of a RAT and so on, and may be parameters that relate to the frequency direction and/or the time direction, such as subcarrier spacing (SCS), symbol duration, cyclic prefix duration, subframe duration, transmission time interval (TTI) duration, and so on. For example, future radio communication systems may support multiple SCS spacings such as 15 kHz, 30 kHz, 60 kHz, 120 kHz and 240 kHz.

Also, future radio communication systems are being studied to introduce time units (also referred to as "subframes," "slots," "minislots," "subslots," "TTIs," "short TTIs," "radio frames" and so on) that are the same as and/or different from those of existing LTE systems (LTE Rel. 13 or earlier versions), while supporting multiple numerologies and/or the like.

Note that a TTI may represent the time unit for use when transmitting/receiving transport blocks for transmitting/receiving data, code blocks and/or codewords. Assuming that a TTI is provided, the period of time (for example, the number of symbols) where the transport blocks, the code blocks and/or the codewords of data are actually mapped may be shorter than the TTI.

For example, when a TTI is formed with a certain number of symbols (for example, fourteen symbols), the transport blocks, the code blocks and/or the codewords of transmitting/receiving data can be transmitted and received in one or a certain number of symbol periods among these. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

Subframes may serve as a time unit having a certain time duration (for example, 1 ms), irrespective of which numerology is used by (and/or configured in) the user terminal (for example, UE (User Equipment)).

On the other hand, slots may serve as a time unit that is based on the numerology used by the UE. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may include a plurality of minislots (subslots).

Generally, subcarrier spacing and symbol duration hold a reciprocal relationship. Therefore, as long as the number of symbols per slot (or minislot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, a study is in progress to support a UL control channel (hereinafter also referred to as a "short PUCCH") that is structured to be shorter in duration than the PUCCH (Physical Uplink Control CHannel) formats of existing LTE systems (for example, LTE Rel. 8 to 13) and/or a UL control channel (hereinafter also referred to as a "long PUCCH") that is structured to have a longer duration than the above short duration.

A short PUCCH (also referred to as a "shortened PUCCH") is formed with a certain number of symbols (for example, one symbol or two symbols) of a given SCS. In this short PUCCH, uplink control information (UCI) and a reference signal (RS) may be time-division-multiplexed (TDM: Time Division Multiplexing) or frequency-division-multiplexed (FDM: Frequency Division Multiplexing). The RS may be, for example, the demodulation reference signal (DMRS: DeModulation Reference Signal), which is used to demodulate UCI.

The SCS in each symbol of the short PUCCH may be the same as or higher than the SCS in symbols for data channels (hereinafter also referred to as "data symbols"). The data channels may be, for example, a downlink data channel (PDSCH: Physical Downlink Shared CHannel), an uplink data channel (PUSCH: Physical Uplink Shared CHannel) and so on.

A short PUCCH may be referred to as a "PUCCH with a higher (bigger, wider, etc.) SCS" (for example, 60 kHz). Note that the time unit in which one short PUCCH is transmitted may be referred to as a "short TTI."

In a short PUCCH, a multicarrier waveform (for example, a waveform based on cyclic prefix OFDM (CP-OFDM: Cyclic Prefix Orthogonal Frequency Division Multiplexing)) may be used, or a single-carrier waveform (for example, a waveform based on DFT-S-OFDM (Discrete Fourier Transform Spread Orthogonal Frequency Division Multiplexing) may be used.

Note that the waveform may be referred to as "communication scheme," "multiplexing scheme," "modulation scheme," "access scheme," "waveform scheme," and so on. Also, these waveforms may be characterized based on whether or not DFT precoding (spreading) is applied to the OFDM waveform. For example, CP-OFDM may be referred to as the "waveform (signal) to which DFT precoding is not applied," and DFT-S-OFDM may be referred to as the "waveform (signal) to which DFT precoding is applied." Furthermore, a "waveform" may also be referred to as "waveform signal," "signal in accordance with waveform," "waveform of signal," "signal," and so on.

Meanwhile, a long PUCCH is arranged over multiple symbols in a slot so as to improve the coverage over a short PUCCH and/or to communicate more UCI. In this long PUCCH, UCI and an RS (for example, the DMRS) may be time-division-multiplexed (TDM) or frequency-division-multiplexed (FDM). A long PUCCH may be referred to as a "PUCCH with a lower (smaller, narrower, etc.) SCS" (for example, 15 kHz). Note that the time unit in which one long PUCCH is transmitted may be referred to as a "long TTI."

Also, a long PUCCH may be comprised of a number of frequency resources to match a short PUCCH, or may be formed with a smaller number of frequency resources (for example, one or two physical resource blocks (PRBs)) than a short PUCCH, in order to achieve a power boosting effect. Also, a long PUCCH may be placed with a short PUCCH in the same slot.

For a long PUCCH, a single-carrier waveform (for example, DFT-s-OFDM waveform) may be used, or a multi-carrier waveform (for example, OFDM waveform) may be used. In addition, frequency hopping may be applied to a long PUCCH, per certain period within a slot (for example, per mini (sub) slot).

Note that a long PUCCH may be a PUCCH that is different from the PUCCHs stipulated in existing LTE systems (for example, LTE Rel. 8 to 13) (that is, a long PUCCH may be a PUCCH of a different format).

Hereinafter, a "PUCCH," when simply mentioned so, may be read as "a short PUCCH and/or a long PUCCH."

The PUCCH may be time-division-multiplexed (TDM) and/or frequency-division-multiplexed (FDM) with a UL data channel (hereinafter also referred to as "PUSCH") in the slot. Also, the PUCCH may be time-division-multiplexed (TDM) and/or frequency-division-multiplexed (FDM) with a DL data channel (hereinafter also referred to as "PDSCH") and/or a DL control channel (hereinafter also referred to as "PDCCH (Physical Downlink Control CHannel)") within the slot.

FIG. 1 is a diagram to show an example of resource mapping of in an NR slot. In NR, a study is underway to define a period (field) in which data is transmitted as a "UL period (UL field)," and define a period (field) in which UL transmission can be performed with a small number of symbols as a "short UL period (UL field)." Note that a UL period (UL field) may be referred to as a "long UL period (UL field)."

FIG. 1 shows an example, in which a PDCCH field is placed at the top of an NR slot, followed by a non-transmission period (also referred to as a "guard period (GP)"), and then there are a UL field/short UL field, but the configuration of NR slots (NR subframes) is not limited to this. For example, the order of each field is not limited to this.

FIG. 1 show an example in which a PUSCH for a specific UE (UE 1) is scheduled in the UL field, and in which, furthermore, this UE transmits a PUCCH using frequency resources adjacent to the PUSCH. The UE may transmit a long PUCCH in the long UL period, and transmit a short PUCCH in the short UL period.

However, how and when to use a long PUCCH and a short PUCCH properly has not been studied yet. Failure to transmit UCI using an appropriate PUCCH may lead to a deterioration of communication throughput, spectral efficiency, and so on.

So, the present inventors have studied a method of reporting UCI properly even when multiple PUCCHs, having mutually different numbers of symbols, are used, and arrived at the present invention.

Now, embodiments of the present invention will be described below in detail with reference to the accompanying drawings. Note that the radio communication methods according to each embodiment may be applied individually or may be applied in combination.

(Radio Communication Method)

According to one embodiment of the present invention, a UE determines the PUCCH type to use to transmit UCI from one or a plurality of PUCCH types based on certain information. A PUCCH type corresponds to a combination of one or a plurality of PUCCHs (for example, a long PUCCH and/or short a PUCCH) to use to transmit UCI.

Figure 2A:
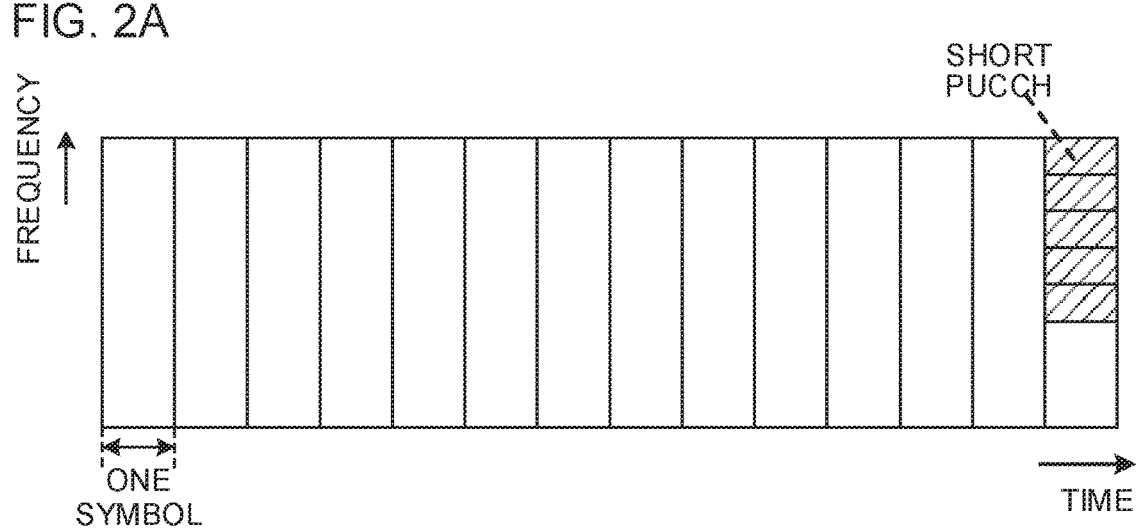
FIGS. 2A to 2C are diagrams to show examples of PUCCH types.
Figure 2B:
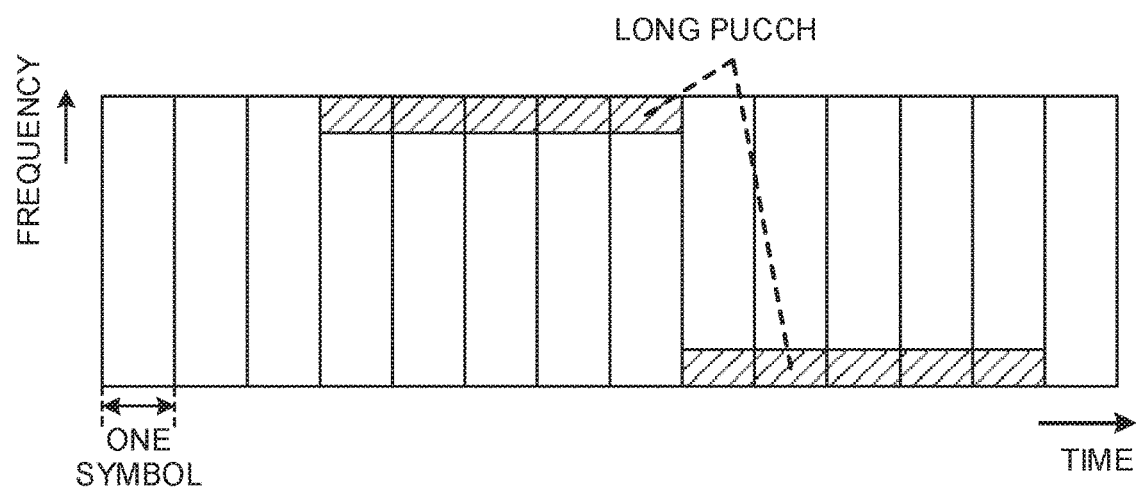
Figure 2C:
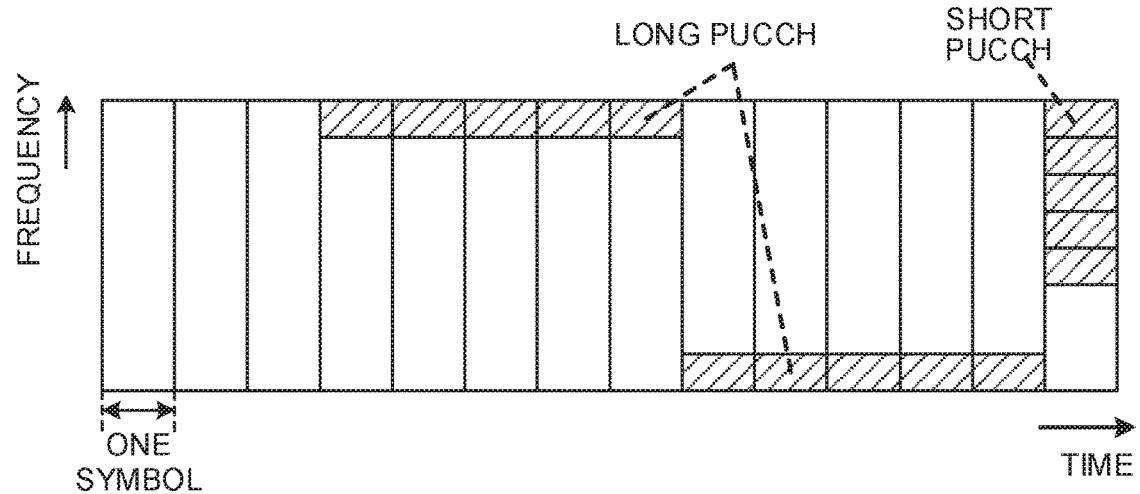

FIGS. 2A to 2C are diagrams to show examples of PUCCH types. In the case of PUCCH type 1, UCI is transmitted using a short PUCCH, and is not transmitted in a long PUCCH (FIG. 2A). In the case of PUCCH type 2, UCI is transmitted using a long PUCCH, and is not transmitted in a short PUCCH (FIG. 2B). In the case of PUCCH type 3, UCI is transmitted using both a short PUCCH and a long PUCCH (FIG. 2C).

Note that, the associations between the index numbers of PUCCH types and PUCCHs are not limited to the examples shown in FIGS. 2A to 2C. In addition, the designation "PUCCH type" is simply an example, which is by no means limiting, and the designation "PUCCH format" and others may be used as well.

Also, in this example, a short PUCCH is mapped to five PRBs in the last symbol of the time field illustrated (which is, for example, a subframe), but the resources corresponding to the short PUCCH are not limited to this example. In addition, although a long PUCCH illustrated to be mapped over ten symbols, where frequency hopping is applied every five symbols, but the resources corresponding to the long PUCCH are not limited to this example.

Also, although FIG. 2C assumes that the time resources of the short PUCCH and the long PUCCH do not overlap, the time resources of the short PUCCH and the long PUCCH may overlap.

A UE may assume that information about the PUCCH type is reported (and configured) by higher layer signaling (for example, RRC signaling, broadcast information), physical layer signaling (for example, DCI), or a combination of these. In this case, the UE may determine the PUCCH type to use for UCI transmission based on information about the PUCCH type reported from the base station.

The UE may determine the PUCCH type to use for UCI transmission based on the size of the UCI (for example, the payload size, the number of UCI bits, etc.) and/or the type of the UCI to transmit. Here, the UCI type may include information indicating the content of the UCI (indicating what UCI is transmitted).

For example, the UCI type may be information to indicate that the UCI includes at least one of retransmission control information in response to the DL data (also referred to as "HARQ-ACK," "ACK/NACK," "A/N," etc.), a scheduling request (SR), channel state information (CSI), beam identification information, a buffer status report (BSR), a power headroom report (PHR), and other pieces of control information.

Note that the beam identification information may be specified based on a beam index (BI), a precoding matrix indicator (PMI), a TPMI (Transmitted PMI), a certain reference signal's port index (for example, a DMRS port index (DPI), an SRS port index (SPI), and a certain reference signal's resource indicator (for example, a CSI-RS resource indicator (CRI), a DMRS resource index, an SRS resource index, etc.).

Also, the UCI type may include information related to the performance and/or the quality required of the UCI. For example, the UCI type may indicate latency (low latency, etc.), reliability (high reliability, etc.), throughput (high throughput, etc.), or a combination of these.

The UE may select PUCCH type 1 if the UCI is relatively small in size and/or low latency is required. For example, the UE may use PUCCH type 1 when the number of UCI bits is equal to or lower than a certain threshold (for example, four), when transmitting an HARQ-ACK, and so on.

The UE may use PUCCH type 1 when supporting/performing self-contained operation. Here, self-contained operation may refer to, for example, an operation to receive a certain DL signal (for example, a data signal) in a certain period (for example, a subframe, a slot, and/or the like) and finish transmitting (feeding back) a UL signal (for example, an HARQ-ACK) based on the DL signal. That is, a UE that supports self-contained operation is likely to have high processing capabilities.

If the size of UCI is relatively large and/or low latency is not required, the UE may select PUCCH type 1. For example, the UE may use PUCCH type 2 when the number of UCI bits is greater than a certain threshold (for example, four), when transmitting CSI, and so on.

When the size of the UCI is large and/or high reliability is required, the UE may select PUCCH type 3. For example, the UE may use PUCCH type 3 when the number of UCI bits is greater than a certain threshold (for example, 30), when transmitting both CSI and an HARQ-ACK, and so on.

Also, the UE may determine the PUCCH type to use for UCI transmission based on the number of times HARQ retransmission is made (or the number of times transmission is made). For example, the UE may use PUCCH type 1 when the number of times the UCI is transmitted is equal to or lower than a first threshold (for example, two), use PUCCH type 2 when the number of times transmission is made is equal to or lower than a second threshold (for example, three), use PUCCH type 3 when the number of times transmission is made is equal to or lower than a third threshold (for example, four). Compared to PUCCH type 1, type 2 and type 3 can use more PUCCH resources and reduce the coding rate and/or the spreading factor of UCI, so that the PUCCH error rate can be reduced.

The above certain threshold, the first to third thresholds and so on may be stipulated in the specification, or may be reported (and configured) to the UE by higher layer signaling (for example, RRC signaling, broadcast information, etc.), physical layer signaling (for example, DCI), or a combination of these.

The UE may determine the PUCCH type to use for UCI transmission based on its own UE category. For example, the UE may judge its performance from its UE category, and select the PUCCH type based on its performance as judged.

If the UE judges itself a high-performance UE (for example, a UE that is compatible with URLLC, a UE that is compatible with high-performance eMBB, etc.), the UE may use PUCCH type 1.

If the UE judges itself a moderate-performance UE (for example, a UE that is compatible with moderate-performance eMBB, a UE that is compatible with LTE/LTE-A MBB), the UE may use the PUCCH type 2.

If the UE judges itself a low-performance UE (for example, a UE that is compatible with mMTC, a UE that is compatible with NB-IoT, a UE that is compatible with low-cost MTC), the UE may use PUCCH type 3.

Information about the UE category and/or information about the carrier's service type (for example, eMBB, URLLC, etc.) may be reported to the UE through higher layer signaling, physical layer signaling or a combination of these. The UE may determine the PUCCH type to use for UCI transmission based on the information about the UE category and/or the service type of the carrier that are reported.

The base station may assume all the PUCCH types and monitor all the PUCCH resources that pertain, or the base station may identify the PUCCH type which the UE is likely to use for UCI transmission and monitor only the specified PUCCH resource. For example, when the UE determines the PUCCH type based on the number of HARQ retransmissions, the base station may specify, based on the number of times an HARQ-ACK is received, the PUCCH type to be used in the next HARQ retransmission.

[UCI Transmitted in PUCCH Type 3]

When the UE uses PUCCH type 3, the UE may transmit one UCI (UCI payload) or transmit a plurality of UCIs (UCI payloads) in all PUCCH resources of a long PUCCH and a short PUCCH both. Here, multiple UCIs may correspond to the same information, or correspond to different pieces of information. For example, the UCI transmitted in the long PUCCH may be different from the UCI transmitted in the short PUCCH.

One UCI may be spread, repeated and/or encoded over both the long PUCCH and the short PUCCH. The ratio of the UCI payload in the long PUCCH and the UCI payload in the short PUCCH (which may be referred to as the "payload ratio") may correspond to the ratio of the PUCCH resources of the long PUCCH and the PUCCH resources of the short PUCCH (which may be referred to as the "resource ratio").

Note that the above payload ratio may be determined based on the resource ratio, or determined by applying a certain offset to the resource ratio. For example, the payload ratio may be adjusted so that the UCI transmitted in the long PUCCH (or the short PUCCH) increases.

Upon receiving a plurality of PUCCHs (for example, a long PUCCH and a short PUCCH), the base station may combine these PUCCHs. This can improve at least one of performance, reliability, and the number of UCI bits.

Figure 3A:
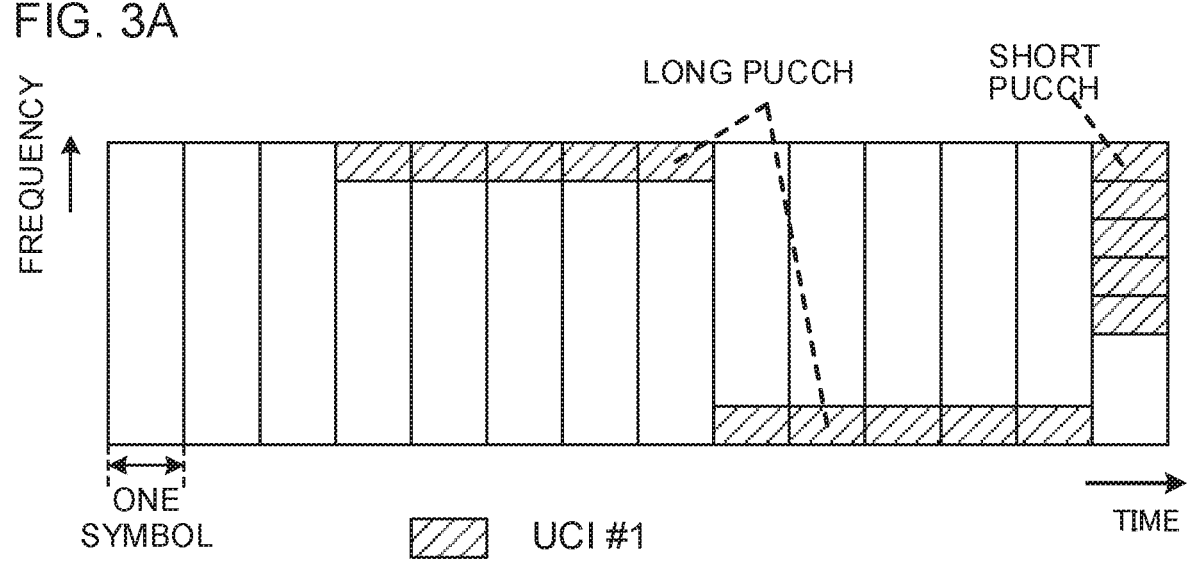
FIGS. 3A and 3B are diagrams to show examples of UCIs that are transmitted in PUCCH type 3.
Figure 3B:
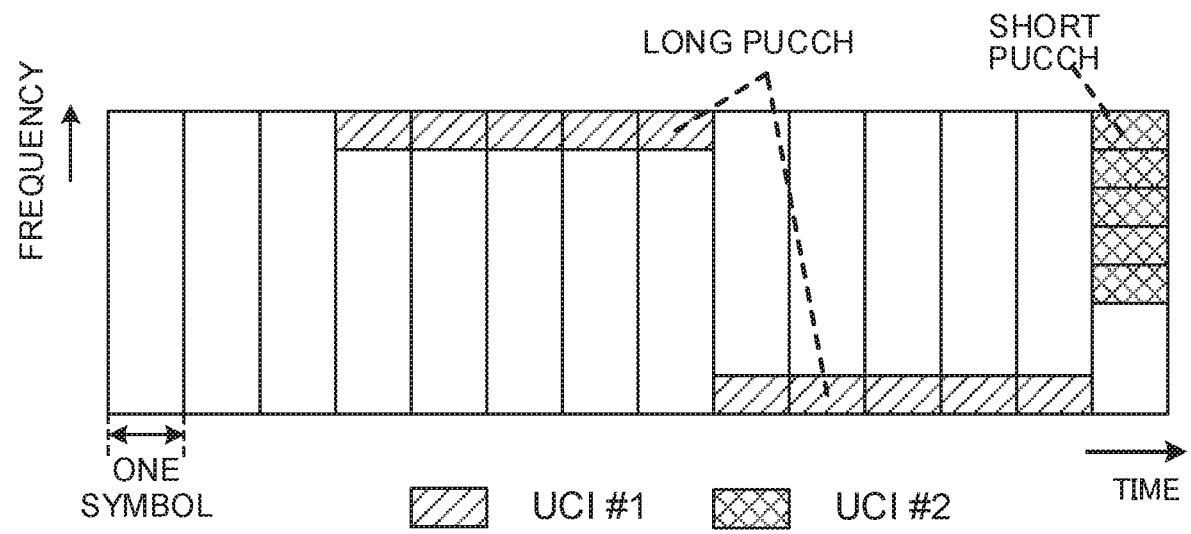

FIGS. 3A and 3B are diagrams to show examples of UCI transmitted in PUCCH type 3. This example shows the same PUCCH resources as in FIG. 2C. FIG. 3A shows an example in which one UCI (UCI #1) is transmitted using both a long PUCCH and a short PUCCH. FIG. 3B shows an example in which one UCI (UCI #1) is transmitted using a long PUCCH and another UCI (UCI #2) is transmitted using a short PUCCH.

Note that, according to the configuration of FIG. 3B, the base station that has received the long PUCCH can perform the receiving process (demodulation, decoding, etc.) of UCI #1 without waiting for receiving the short PUCCH, so that the processing delay can be reduced.

Information as to whether one UCI is transmitted or multiple UCIs are transmitted using a long PUCCH and a short PUCCH when PUCCH type 3 is used may be reported to the UE by higher layer signaling, physical layer signaling or a combination of these. This information may be the number of UCIs that can be included in the long PUCCH and/or the short PUCCH. The UE may determine the UCI to transmit in each PUCCH based on the reported information.

When the UE uses PUCCH type 3 based on the size of the UCI (for example, the payload size, the number of UCI bits, etc.) to transmit and/or the UCI type, the UE may decide whether to transmit one UCI or multiple UCIs in the long PUCCH and the short PUCCH.

When the size of UCI is relatively small and/or high reliability is required, the UE may decide to transmit one UCI in the long PUCCH and the short PUCCH. For example, when the number of UCI bits is equal to or lower than a certain threshold (for example, four), the UE may decide to transmit one UCI in the long PUCCH and the short PUCCH, when, for example, transmitting an HARQ-ACK.

If the size of UCI is relatively large and/or high reliability is not required, the UE may decide to transmit a plurality of UCIs in the long PUCCH and the short PUCCH. For example, when the number of UCI bits is greater than a certain threshold (for example, four), the UE may decide to transmit a plurality of UCIs in the long PUCCH and the short PUCCH, when, for example, transmitting CSI and so on.

[RS Configuration of PUCCH Type]

The RS configuration in each PUCCH type (for example, to which radio resource an RS is mapped) may be associated with the PUCCH type in advance, or may be configured in the UE from the base station. Information about the RS configuration in a certain PUCCH type (which may be referred to as "RS configuration information") may be reported to the UE by higher layer signaling, physical layer signaling or a combination of these.

The RS configuration information may include information indicating the length of the PUCCH. Also, the RS configuration information may include information to indicate the method of multiplexing UCI and RSs (for example, TDM, FDM, etc.). Note that the RS configuration information pertaining to PUCCH type 3 may include RS configuration information related to a short PUCCH and RS configuration information related to a long PUCCH.

Also, RS configuration information of all PUCCH types needs not be reported explicitly. In this case, RS configuration information pertaining to a certain PUCCH type may be judged based on RS configuration information pertaining to another PUCCH type.

For example, assume a case where RS configuration information for PUCCH types 1 and 2 is reported to the UE and where RS configuration information for PUCCH type 3 is not reported. In this case, the UE may map RSs in the short PUCCH in PUCCH type 3 based on the RS configuration information for PUCCH type 1, and map RSs in the long PUCCH in PUCCH type 3 based on the RS configuration information for PUCCH type 2.

As another example, assume a case where RS configuration information for PUCCH type 3 is reported to the UE, and where RS configuration information for PUCCH type 1 and type 2 is not reported to the UE. In this case, the UE may map RSs in PUCCH type 1 based on the RS configuration information for the short PUCCH in PUCCH type 3, and map RSs in PUCCH type 2 based on the RS configuration information for the long PUCCH in PUCCH type 3.

Hereinafter, an example of RS configurations in PUCCH type 3 will be described with reference to FIG. 4 to FIG. 8. RS configurations for PUCCH types 1 and 2 may be replaced with the RS configurations of short PUCCH and long PUCCH fields in each example.

Figure 4A:
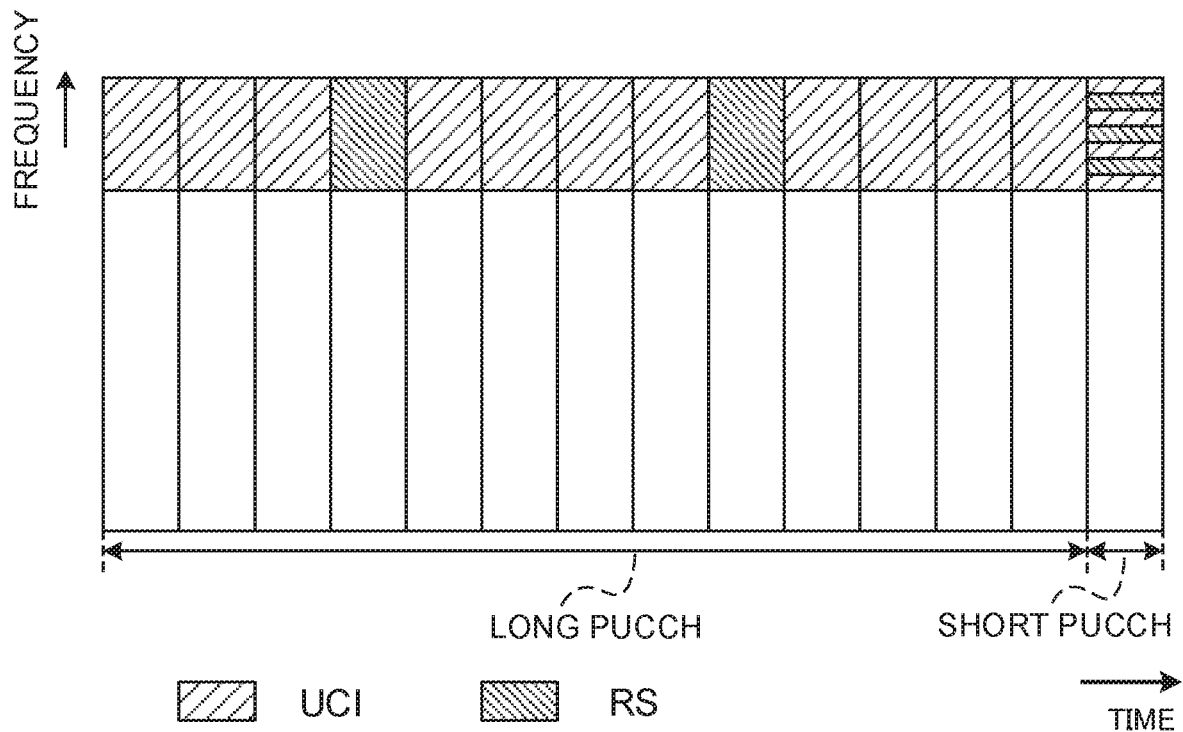
FIGS. 4A and 4B are diagrams to show examples of RS configurations in PUCCH type 3.
Figure 4B:
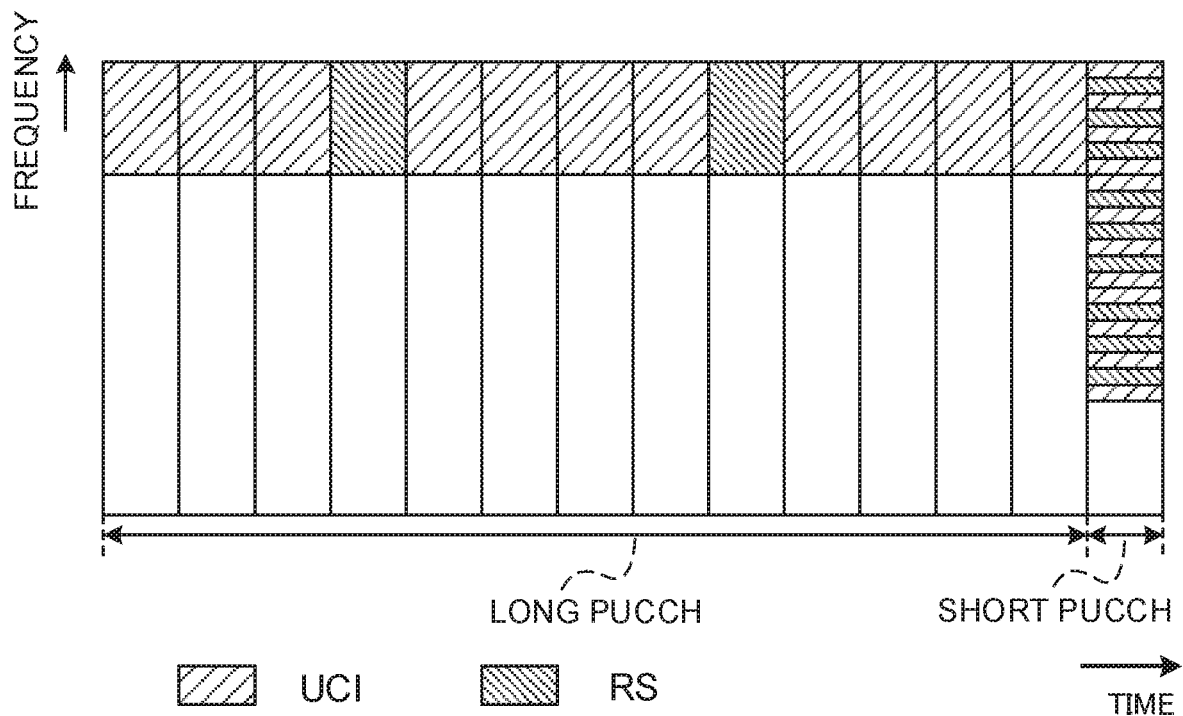

FIGS. 4A and 4B are diagrams to show examples of RS configurations in PUCCH type 3. In this example, an RS and UCI are time-division-multiplexed (TDM) in the long PUCCH, and an RS and UCI are frequency-division-multiplexed (FDM) in the short PUCCH. The frequency resources for the short PUCCH (for example, the transmission bandwidth, PRBs, resource elements, subbands, etc.) may be the same as the frequency resources for the long PUCCH (FIG. 4A), may be larger than the frequency resource of long PUCCH (FIG. 4B), or may be smaller than the frequency resources of long PUCCH (which will be described later with reference to FIG. 8).

In FIG. 4B, the frequency resources (the number of PRBs) of the short PUCCH are three PRBs, and, although a configuration is shown here in which the RS assumes the same relative positions in each PRB, the RS may as well assume different relative positions per PRB.

Figure 5A:
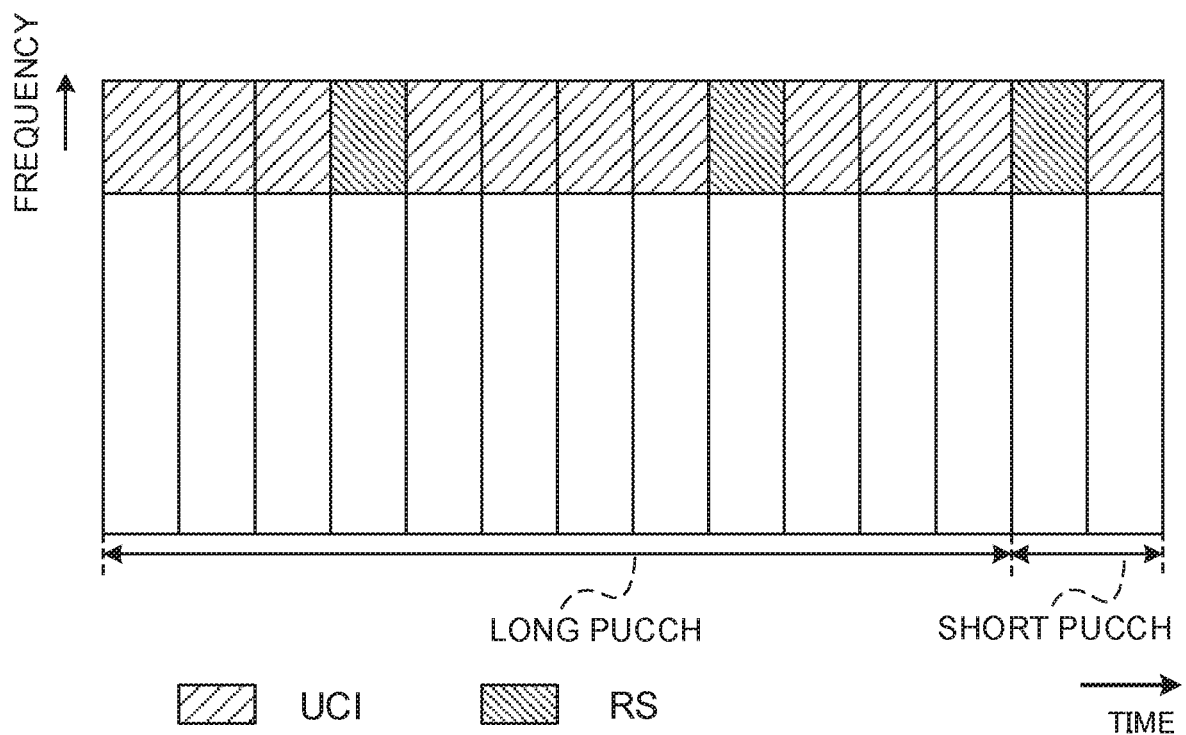
FIGS. 5A and 5B are diagrams to show other examples of RS configurations in PUCCH type 3.
Figure 5B:
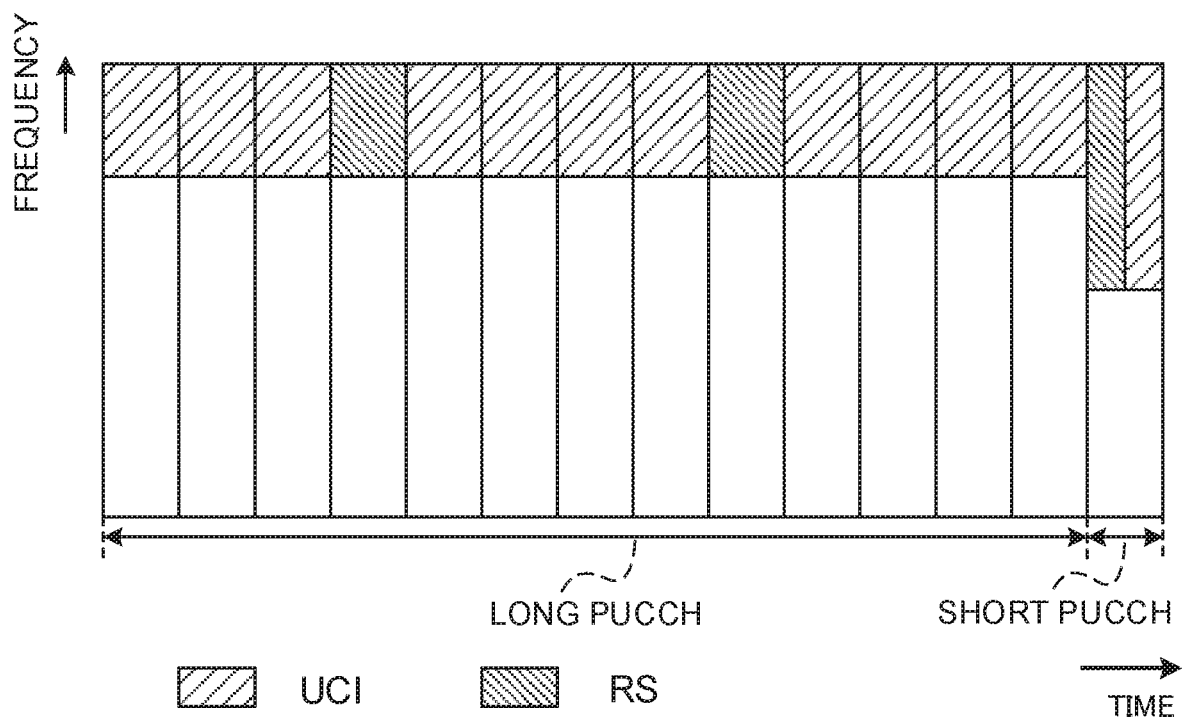

FIGS. 5A and 5B are diagrams to show other examples of RS configurations for PUCCH type 3. In this example, RS and UCI are time-division-multiplexed (TDM) in the long PUCCH, and RS and UCI are time-division-multiplexed (TDM) also in the short PUCCH. When the time resources for the short PUCCH are two or more symbols, RS and UCI may be mapped to different symbols in the short PUCCH (FIG. 5A).

If the time resources for the short PUCCH is one symbol or less, the RS and UCI in the short PUCCH may be mapped using multiple symbols provided at a higher SCS (which may be referred to as, for example, a "short symbols"), within one symbol in the slot (for example, may be referred to as a "long symbol") (FIG. 5B). In FIG. 5B, the short PUCCH and the long PUCCH are each comprised of one PRB (the number of same subcarriers), but the transmission bandwidth occupied by the short PUCCH is larger than that of the long PUCCH.

Figure 6A:
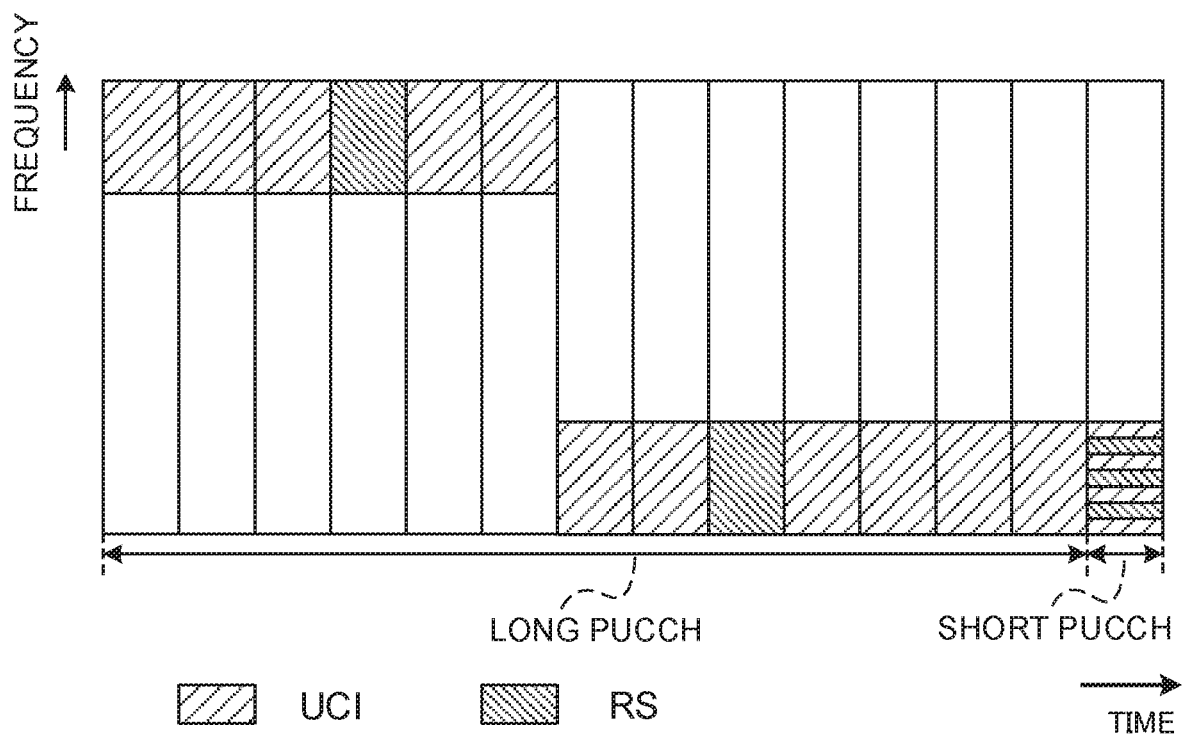
FIGS. 6A and 6B are diagrams to show still other example of RS configurations in PUCCH type 3.
Figure 6B:
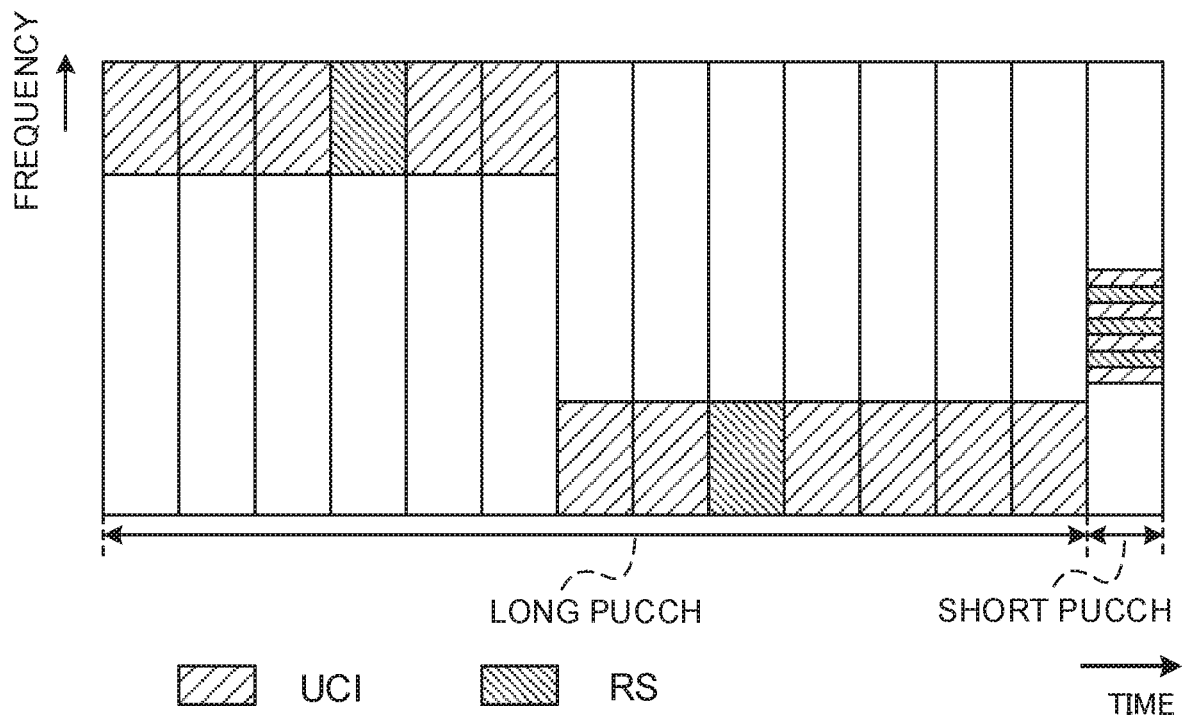

FIGS. 6A and 6B are diagrams to show yet other examples of RS configurations for PUCCH type 3. In this example, as in the example of FIG. 4A, RS and UCI are time-division-multiplexed (TDM) in the long PUCCH, and RS and UCI are frequency-division-multiplexed (FDM) in the short PUCCH. Meanwhile, in this example, the long PUCCH is mapped by using frequency hopping.

The frequency resources for the short PUCCH may be the same as frequency resources that hop in the long PUCCH (FIG. 6A), or may be resources that are different from (that do not overlap) the frequency resources that hop in the long PUCCH (FIG. 6B). According to the configuration shown in FIG. 6B, the frequency diversity gain can be improved higher for transmission of UCI, and improved UCI error rates can be expected.

Figure 7:
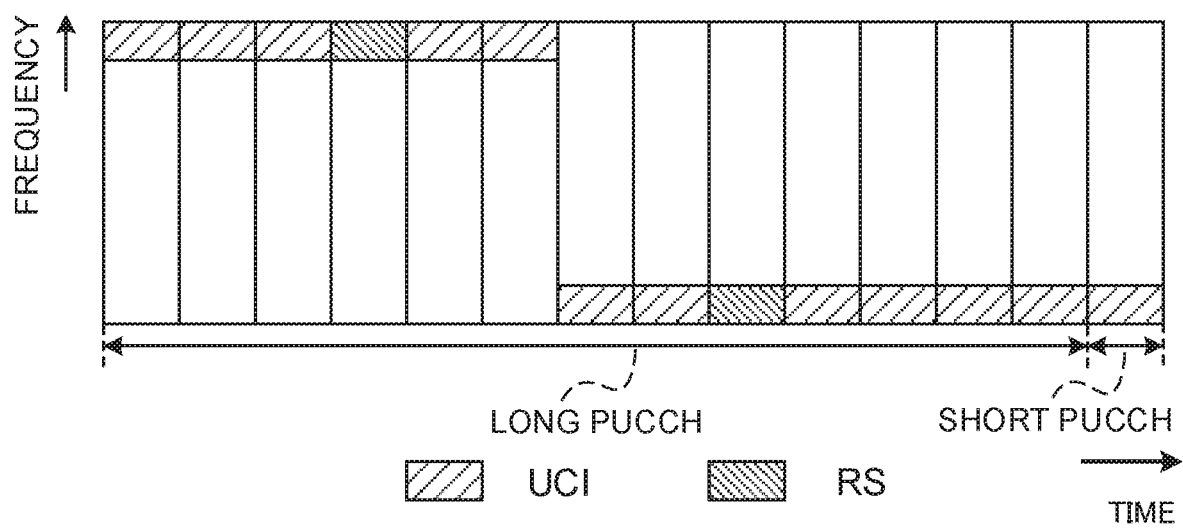
FIG. 7 is a diagram to show examples of short PUCCHs of PUCCH type 3 with or without an RS.

FIG. 7 is a diagram to show examples of short PUCCHs with or without an RS in PUCCH type 3. In this example, the long PUCCH and the short PUCCH are mapped to the same frequency resources as in FIG. 6A. Meanwhile, in the short PUCCH, UCI is mapped, but no RS is mapped (RS is punctured). The UE may demodulate the UCI in the short PUCCH based on the RS in the long PUCCH. By puncturing the RS, the size of UCI that can be transmitted can be increased and/or the coding rate of UCI can be reduced, so that the UCI error rate can be improved.

The UE may decide whether or not to map (or puncture) the RS in the short PUCCH based on specific conditions. For example, information to indicate that an RS is mapped (or punctured) in the short PUCCH is reported via higher layer signaling, physical layer signaling, or a combination of these, the UE may map (or puncture) an RS in the short PUCCH.

Also, based on the frequency resource of the short PUCCH and/or the frequency resource of the long PUCCH, the UE may determine whether to punctuate the RS in the short PUCCH. For example, if the bandwidth of the short PUCCH is the same as or narrower than the bandwidth of the long PUCCH, the UE may decide to puncture the RS in the short PUCCH.

If the bandwidth of the short PUCCH is wider than the bandwidth of the long PUCCH, the UE may decide to puncture the RS in the short PUCCH. When the channel frequency selectivity is low, (for example, when a PUCCH is transmitted in a high frequency band, there are limited scatterers around the UE), even if the RS of the short PUCCH having a wider bandwidth than the bandwidth of long PUCCH is punctured, it is assumed that degradation of channel estimation accuracy is small.

Information as to whether or not the RS in the short PUCCH is punctured (or may be punctured), when the bandwidth of the short PUCCH is the same as (and/or narrower than and/or wider than) the bandwidth of the long PUCCH may be reported to (configured in) the UE from the network by higher layer signaling, physical layer signaling, or a combination of these. When this information is reported, the UE may determine whether or not to punctuate the RS in the short PUCCH based on the information and the bandwidth of each PUCCH.

Figure 8A:
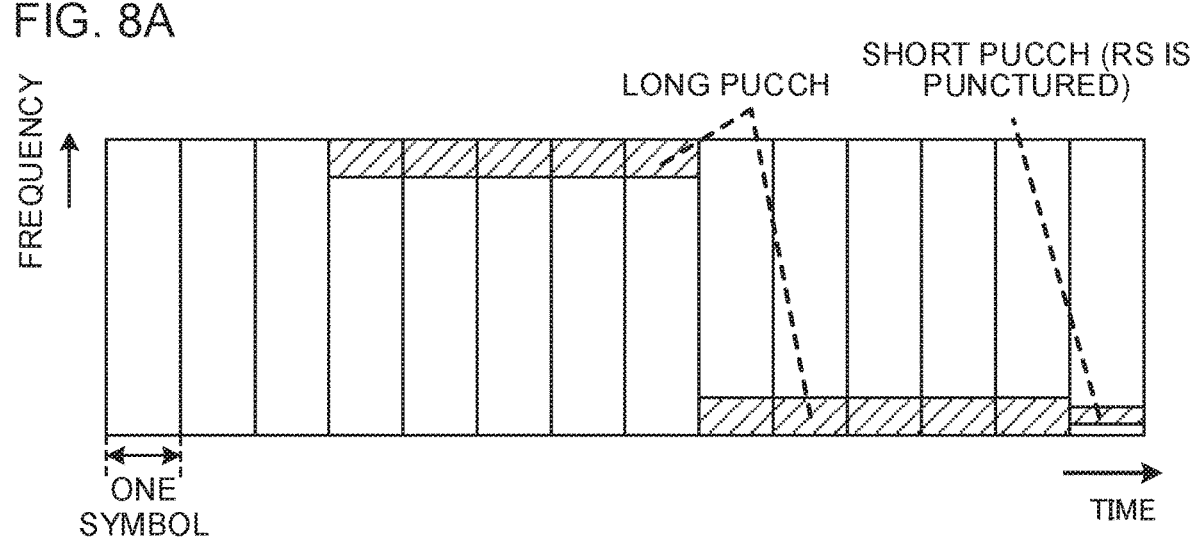
FIGS. 8A and 8B are diagrams to show examples of the relationship between bandwidth and the presence or absence of an RS in short PUCCHs of PUCCH type 3.
Figure 8B:
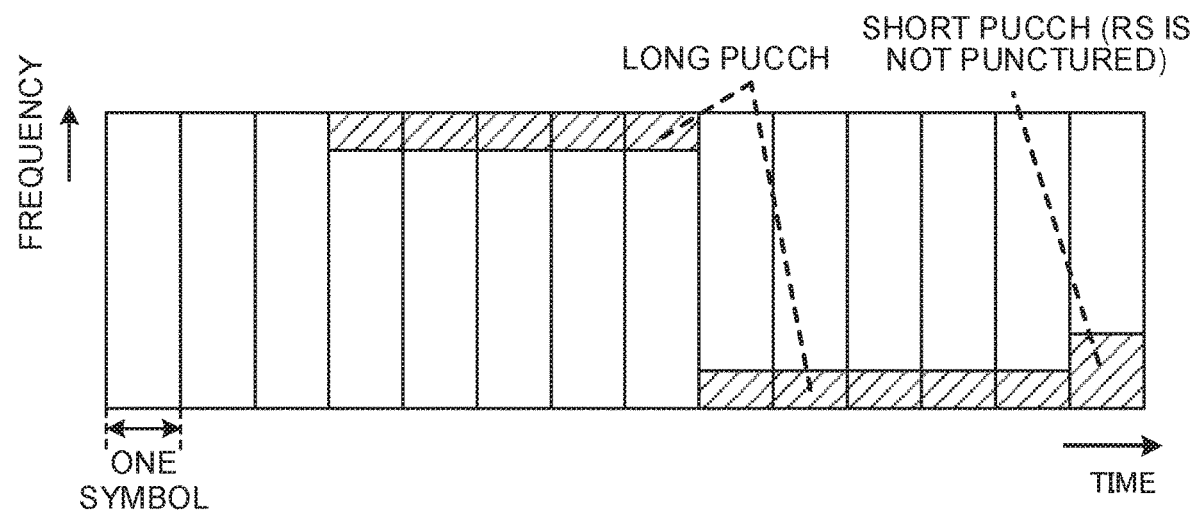

FIGS. 8A and 8B are diagrams to show examples of the relationship between the bandwidth of the short PUCCH in PUCCH type 3 and the presence/absence of an RS. In the case of FIG. 8A, the bandwidth of the short PUCCH is narrower than the bandwidth of the long PUCCH, so that the RS in the short PUCCH is punctured. Meanwhile, in the case of FIG. 8B, the bandwidth of the short PUCCH is wider than the bandwidth of the long PUCCH, the RS in the short PUCCH is not punctured (RS and UCI are TDM and/or FDM in the short PUCCH).

[Sequence-Based PUCCH]

In NR, DMRS-based transmission and sequence-based transmission are under study as PUCCH transmission methods.

Since DMRS-based transmission reports UCI in an uplink control channel including the DMRS for demodulating UCI (hereinafter also referred to as "DMRS-based PUCCH"), DMRS-based transmission may be referred to as "coherent transmission," "coherent design," and so on.

Since sequence-based transmission reports UCI in an uplink control channel not including the DMRS for demodulating UCI (hereinafter also referred to as "sequence-based PUCCH"), sequence-based transmission may be referred to as "non-coherent transmission (non-coherent transmission)," "non-coherent design," and the like. Details of a sequence-based PUCCH will be described later.

In the present specification, up till here, each PUCCH type has been described in association with a DMRS-based PUCCH, but this is by no means limiting. For example, one or both of a long PUCCH and a short PUCCH may be a sequence-based PUCCH.

When sequence-based PUCCH is used for a short PUCCH in PUCCH type 3, the UE may transmit one UCI (UCI payload) or a plurality of UCIs (UCI payloads) in all PUCCH resources of both the long PUCCH and the short PUCCH. Here, a plurality of UCIs may correspond to the same information, or may correspond to pieces of different information. For example, the UCI transmitted in the long PUCCH may be different from the UCI transmitted in the short PUCCH.

One UCI may be spread, repeated and/or encoded over both the long PUCCH and the short PUCCH. The ratio of the UCI payload in the long PUCCH and the UCI payload in the short PUCCH (which may be referred to as the "payload ratio") may correspond to the ratio of the PUCCH resources of the long PUCCH and the PUCCH resources of the short PUCCH (which may be referred to as the "resource ratio").

Note that, the payload ratio may be determined based on the resource ratio, or may be determined by applying a certain offset to the resource ratio. For example, the payload ratio may be adjusted so that more UCIs are transmitted in the long PUCCH (or in the short PUCCH).

Also, given a sequence-based PUCCH, if the maximum number of UCI bits (for example, X bits) that can be transmitted is configured in the UE, X bits, out all the UCI bits, may be transmitted in the short PUCCH, and the remaining bits excluding the above X bits out of all the UCI bits may be transmitted in the long PUCCH. Information about the maximum number of UCI bits that can be transmitted may be reported to the UE by higher layer signaling, physical layer signaling, or a combination of these.

FIGS. 9A and 9B are diagrams to show examples of UCIs where a sequence-based PUCCH is used for the short PUCCH of PUCCH type 3. In this example, the same PUCCH resources as in FIG. 2C are shown. FIG. 9A shows an example in which one UCI (UCI #1) is transmitted using both the long PUCCH (DMRS-based) and the short PUCCH (sequence-based). FIG. 9B shows an example in which one UCI (UCI #1) is transmitted in the long PUCCH (DMRS-based), and another UCI (UCI #2) is transmitted in the short PUCCH (sequence-based).

By higher layer signaling, physical layer signaling or a combination of these, information as to whether to use a sequence-based PUCCH in the long PUCCH and/or the short PUCCH may be reported to the UE. The UE may decide whether to use a DMRS-based PUCCH or a sequence-based PUCCH as the long PUCCH and/or the short PUCCH.

Hereinafter, a sequence-based PUCCH will be described in detail. UCI that is reported via a sequence-based PUCCH is detected by the network without requiring DMRSs, and therefore a sequence-based PUCCH may be referred to as an RS that does not require UCI ("RS w/o UCI"), and/or the like. In addition, UCI to that is reported via a sequence-based PUCCH can also be reported using orthogonal resources that are used to transmit a certain RS, and therefore a sequence-based PUCCH may be referred to as "RS on UCI," "UCI-reporting RS," and so on.

Note that the orthogonal resource may be at least one of a base sequence (orthogonal sequence), the amount of phase rotation, a cyclic shift (CS), an orthogonal code (which may be referred to as, for example, an "OCC (Orthogonal Cover Code)"), a time and/or frequency resource, and the like.

A base sequence of a sequence-based PUCCH may be a CAZAC (Constant Amplitude Zero Auto-Correlation) sequence (for example, a Zadoff-Chu sequence), or may be a sequence (CG-CAZAC (Computer-Generated CAZAC) sequence) conforming to a CAZAC sequence, such as one that is specified in 3GPP TS 36.211 § 5.5.1.2 (in particular, Table 5.5.1.2-1 and Table 5.5.1.2-2) and so on.

Information about the base sequence may be configured (reported) from the network (for example, a base station) to the UE by higher layer signaling, physical layer signaling, or a combination of these. Also, a plurality of candidates of transmission resources for sequence-based transmission may be associated with a plurality of candidate values for the UCI that is reported, respectively. These transmission resources may be orthogonal resources (which may be referred to as "spreading code resources") that can be code-division-multiplexed (CDM).

Information indicating the above multiple candidates may be reported from the network to the UE by higher layer signaling, physical layer signaling, or a combination of these. The UE may select one orthogonal resource from among a plurality of candidates depending on the value of the UCI to be reported, and transmit the sequence-based PUCCH using the selected resource.

Hereinafter, a case where the transmission resources for reporting UCI are the amounts of phase rotation will be described. Multiple candidates of the phase rotation amount assigned to one UE may be referred to as a "phase rotation amount set." Here, a case is assumed where a sequence-based PUCCH is transmitted using one PRB (the number of subcarriers M is twelve), but this is by no means limiting.

FIG. 20 is a diagram to show an example of a phase rotation amount set. In this example, the UCI is two-bit information. Since two-bit UCI takes four values, the phase rotation amount set includes four phase rotation amounts.

The sequence length of the base sequence used for the sequence-based PUCCH is determined by the number of subcarriers M and the number of PRBs. In this case, since one PRB is assumed, when this base sequence is a Zadoff-Chu sequence, the sequence length is the largest prime number (=11)–1=10 below 12, and there are twelve phase rotations that can be used. For example, twelve phase rotation amounts $\alpha_0$-$\alpha_{11}$ provided at phase intervals of $2\pi/12$ may be defined.

The twelve sequences obtained by phase-rotating base sequences by phase rotation (cyclic shift) amounts $\alpha_0$ to $\alpha_{11}$ are orthogonal to each other. Note that phase rotation amounts $\alpha_0$ to $\alpha_{11}$ may be defined based on at least one of the number of subcarriers, M, the number of PRBs and the sequence length of base sequences. The set of phase rotation amounts may be comprised of two or more phase rotation amounts selected from phase rotation amounts $\alpha_0$ to $\alpha_{11}$.

Figure 10B:
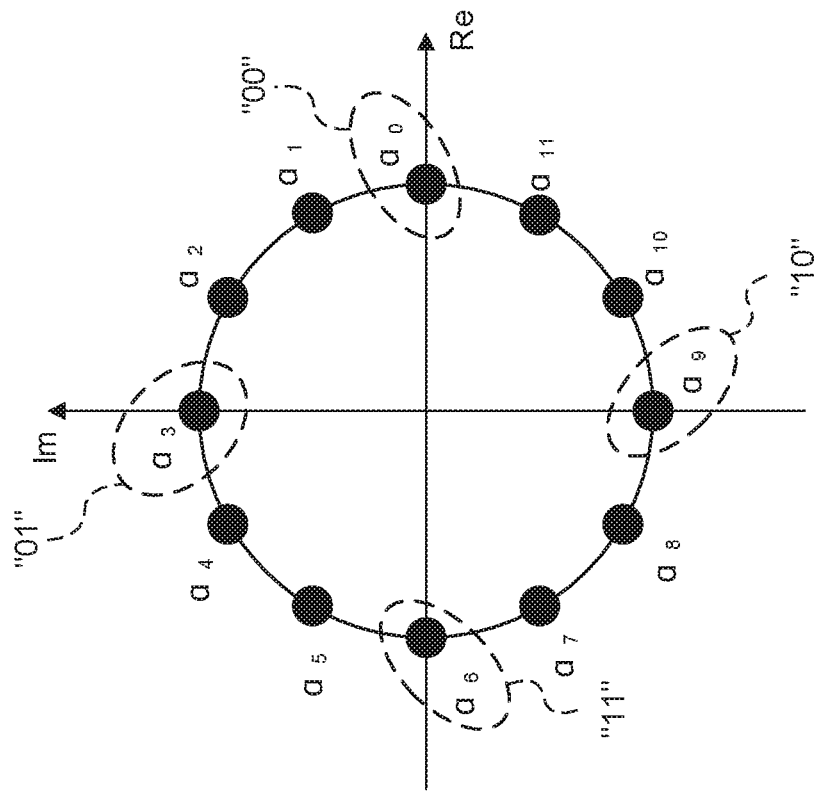
FIGS. 10A and 10B are diagrams to show examples of phase rotation amount sets (in this example, UCI is assumed to be two-bit information)
Figure 10A:
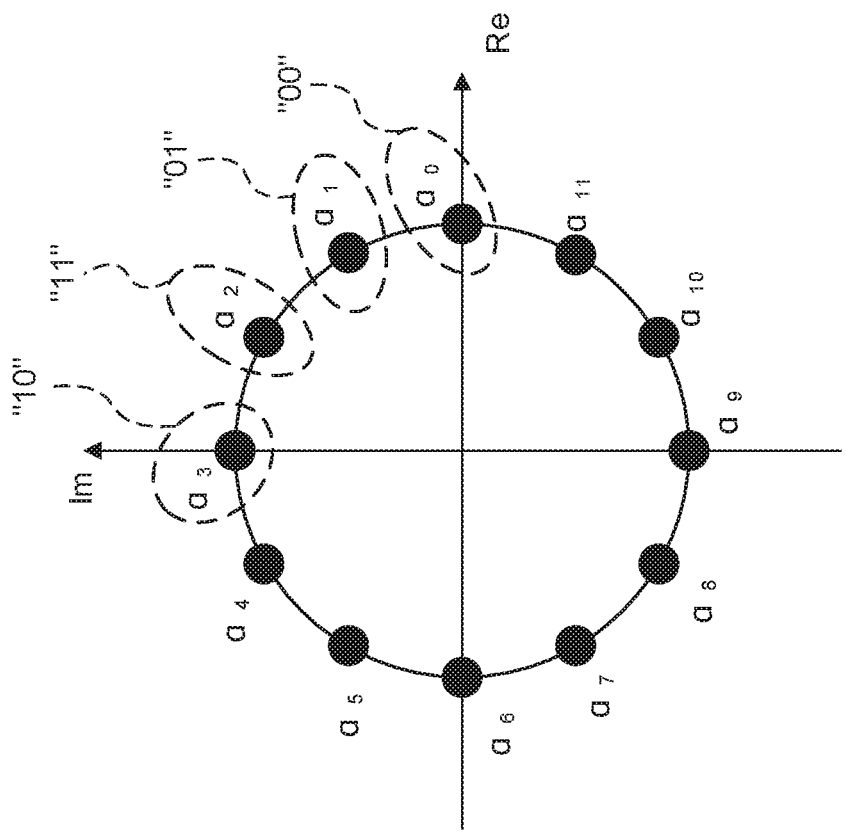

The set of the phase rotation amount of sequence type 0 shown in FIG. 10A is comprised of a plurality of adjacent (continuous) phase rotation amounts. The set of phase rotation amounts includes four phase rotation amounts $\alpha_1$, $\alpha_1$, $\alpha_2$, and $\alpha_3$, each separated by $\pi/6$. The set of phase rotation amounts of sequence type 1 shown in FIG. 10B is comprised of a plurality of phase rotation amounts separated from each other. This set of phase rotation amounts includes four phase rotation amounts $\alpha_0$, $\alpha_3$, $\alpha_6$, and $\alpha_9$ apart from each other by $\pi/2$.

In an environment with low frequency selectivity, the cross correlation between sequence type 0 and sequence type 1 is little (there is no interference between sequences generated in each sequence type). Therefore, in an environment with low frequency selectivity, the UCI error rate is equal for both sequence type 0 and sequence type 1. If sequence type 0 is used, twelve phase rotation amounts can be provided more densely, so that three UEs can each use four phase rotation amounts, allowing more efficient use of phase rotation amounts.

On the other hand, in an environment with strong frequency selectivity, since the cross correlation between sequences generated by applying adjacent phase rotation amounts is significant, and the UCI error of UCI increases. Therefore, when the frequency selectivity is strong, using sequence type 1 can lower the UCI error rate compared to using sequence type 0.

The UE may assume using sequence type 0 if the transmission bandwidth allocated to a PUCCH is equal to or greater than a certain value, and select sequence type 1 if the transmission bandwidth allocated to a PUCCH is less than the certain value. Thus, without reporting the sequence type from the network, the UE can select a sequence type that satisfies a certain error rate.

Figure 11:
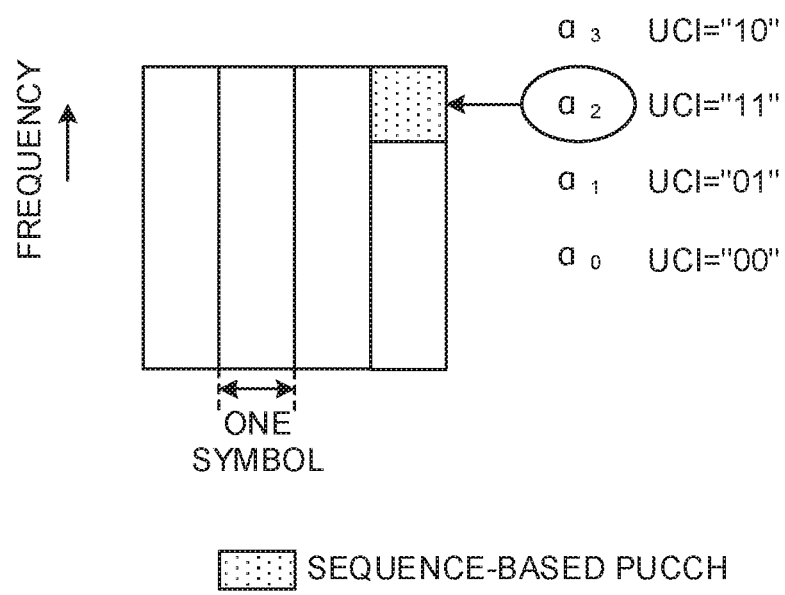
FIG. 11 is a diagram to show an example of a sequence-based PUCCH.

FIG. 11 is a diagram to show an example of a sequence-based PUCCH. As shown in FIG. 11, when the UE, to which the set of phase rotation amounts of FIG. 10A is assigned, selects "11" as two-bit UCI to be reported, the reference sequence is phase-rotated using corresponding $\alpha_2$, to generate a sequence-based PUCCH.

Figure 12B:
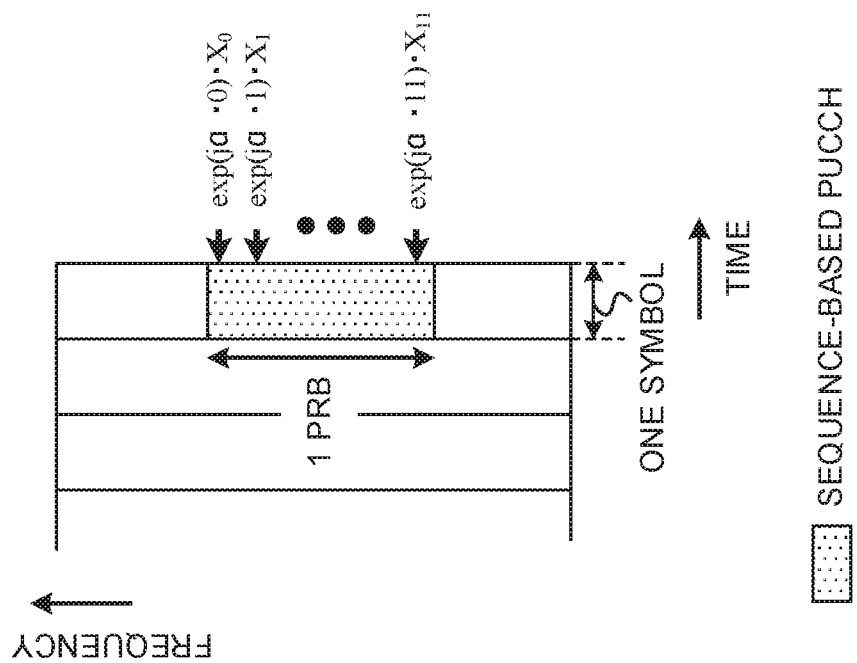
FIGS. 12A and 12B are diagrams to show examples of processes for generating sequence-based PUCCHs.
Figure 12A:
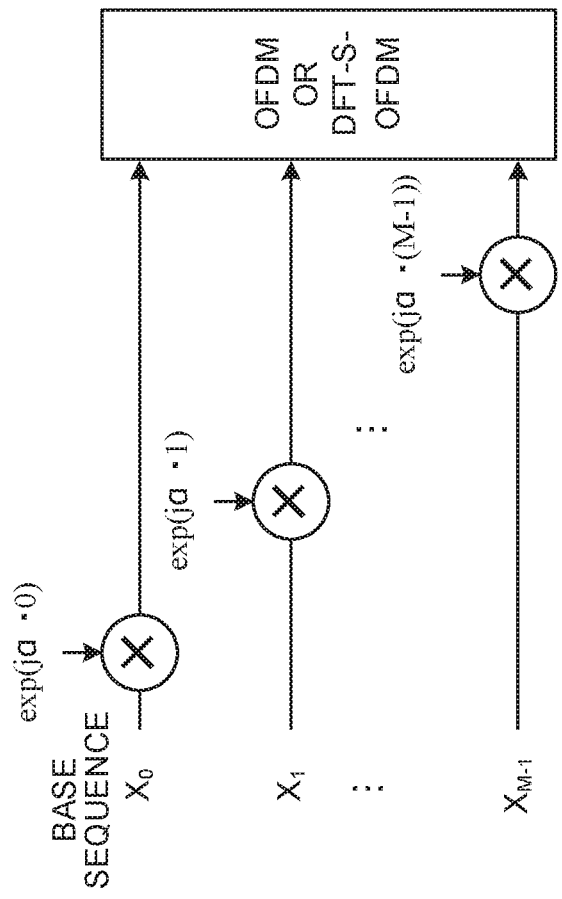

FIGS. 12A and 12B are diagrams to show examples of sequence-based PUCCH generation processes. The UE applies phase rotation to base sequences $X_0$-$X_{M-1}$ of sequence length M according to phase rotation amount $\alpha$ that is selected, and performs an OFDM or DFT-S-OFDM process on the phase-rotated base sequences. The UE transmits the output signals having been subjected to the OFDM or DFT-S-OFDM process (FIG. 12A).

FIG. 12B is a diagram to show an example of resource mapping of sequence-based PUCCHs. If sequence-based PUCCHs are transmitted using one PRB (the number of subcarriers M is 12) in a given symbol (for example, one symbol), base sequences $X_0$-$X_{M-1}$ are phase-rotated using phase rotation amounts $\alpha$ associated with certain information, and each base sequence is mapped to subcarriers in this one PRB. Note that the base sequences may be used with some of the base sequences reused or expanded.

Note that $\alpha$ represents an arbitrary phase rotation amount which the UE can select, and, for example, if the UE is assigned the set of phase rotation amounts in FIG. 10A, $\alpha$ is one of $\alpha_0$, $\alpha_1$, $\alpha_2$, and $\alpha_3$, selected depending on UCI.

Next, the reception determination operation of sequence-based UCI will be described. The receiving apparatus (for example, the network (base station)) may detect sequence-based UCI (judge the content of UCI) from received signals by using maximum likelihood detection (ML detection) (which may be referred to as "correlation detection").

Specifically, the receiving apparatus generates sequence-based UCI base sequences (transmission signal sequences). Alternatively, replica of the amounts of phase rotation (UCI phase rotation amount replicas) assigned to the transmitting apparatus (for example, a UE) may be generated (for example, four patterns are generated when a sequence based UCI is two bits), and the transmission signal waveforms may be generated using the generated base sequences and UCI phase rotation amount replicas in the same way as in the transmission apparatus.

Also, the receiving apparatus may calculate the correlation between the transmission signal waveforms obtained thus, and the received signal waveforms received from the transmitting apparatus, for all the UCI phase rotation amount replicas, and assume that the UCI phase rotation amount replica with the highest correlation has been transmitted.

For example, the receiving apparatus generates transmission signal sequences (M complex-number sequences) by applying phase rotation, based on UCI phase rotation amount replicas, to a base sequence. The receiving device multiplies the received signal sequences (M complex-number sequences) after the DFT, having a size of M, with the complex conjugates of the transmission signal sequences, on an element by element basis, and calculates a likelihood based on the M sequences obtained.

The likelihood may be the sum of the absolute values (or the squares of the absolute values) of the multiplication results for each element of the received signal sequences and the transmission signal sequences. The receiving apparatus may estimate that the sequence-based UCI corresponding to the UCI phase rotation amount replica with the maximum likelihood among all the UCI phase rotation amount replicas has been transmitted.

In addition, the receiving apparatus may perform channel estimation using the UCI phase rotation amount replicas (for example, four times when the UCI is two bits), perform demodulation and error detection of UCI based on the results of channel estimation (or error correction), and detect sequence-based UCI by specifying the phase rotation amount replicas of UCI in which no error is detected (or the number of bits where error is detected is small).

The receiving apparatus may generate a transmission signal replicas to match the maximum number of phase rotation amounts that can be assigned (for example, twenty four the event of two PRBs), and estimate the phase rotation amount having the highest correlation with the received signal in the same operation as the above-described operation. When phase rotation amounts other than the assigned phase rotation amount are estimated, it may be presumed that the one closest to the estimated value among the assigned phase rotation amounts has been transmitted.

The receiving apparatus may detect the correlation between the latency time of a time domain transmission signal waveform generated from a base sequence with phase rotation amount=0 and a received time domain received signal waveform, and estimate the phase rotation amount according to the latency time amount at which the correlation value becomes maximum.

Even when a plurality of UEs are multiplexed, since received signals from the plurality of UEs are orthogonal to each other, the network can detect sequence-based UCI using the phase rotation amount assigned to a specific UE.

Note that, although a case where sequence-based UCI is generated by applying phase rotation to a base sequence has been mainly described as an example here, this is not limiting. The "phase rotation amount" may be replaced with "orthogonal resource," "other orthogonal resource (for example, "orthogonal code," "orthogonal sequence," "cyclic shift," "time and/or frequency resource," etc.)," and the like.

As explained above, according to one embodiment of the present invention, the UE can appropriately determine the PUCCH type to use to transmit UCI.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 13:
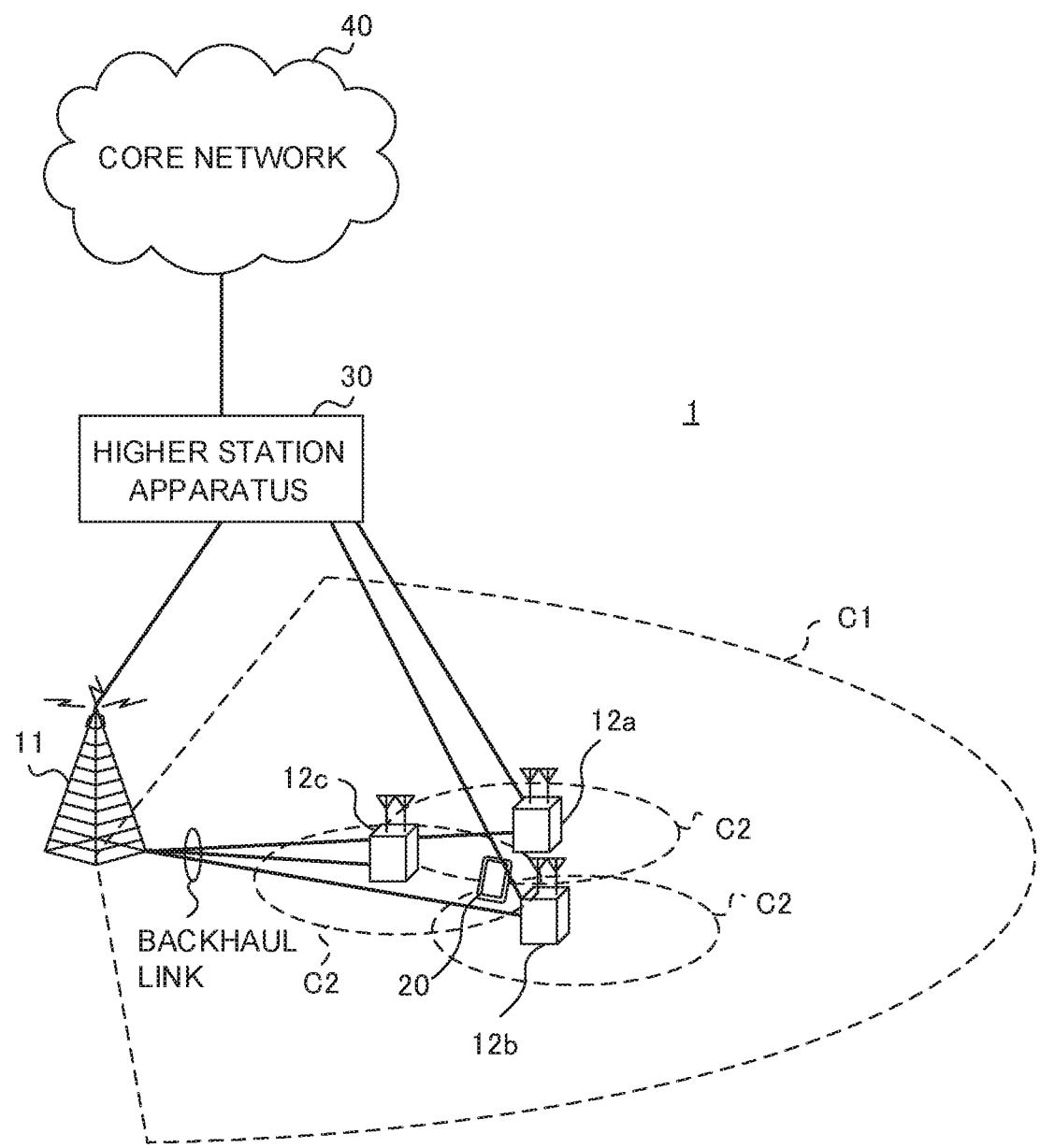
FIG. 13 is a diagram to show an example of a schematic structure of a radio communication system according to one embodiment of the present invention.

FIG. 13 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, downlink control information (DCI) and so on, is communicated by the PDCCH.

Note that scheduling information may be reported via DCI. For example, the DCI for scheduling DL data reception may be referred to as "DL Assignment," and the DCI to schedule UL data transmission may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, in the PUCCH, downlink radio quality information (CQI: Channel Quality Indicator), delivery acknowledgment information, scheduling requests (SRs) and so on are communicated. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 14:
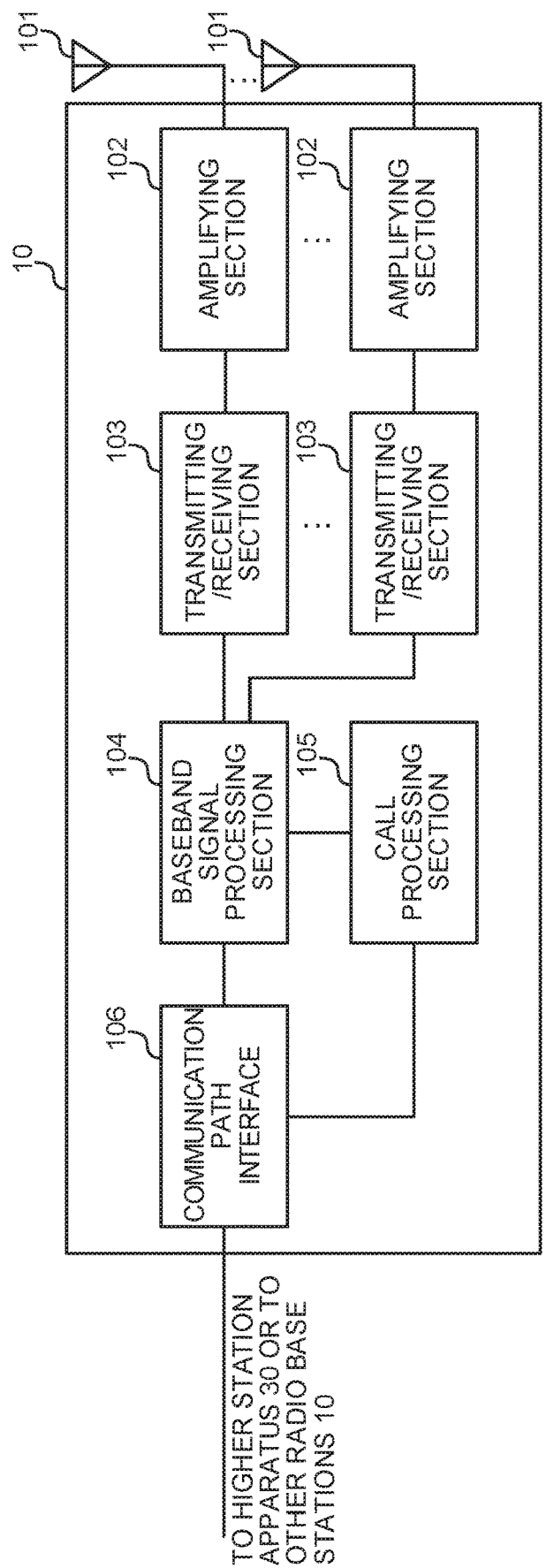
FIG. 14 is a diagram to show an example of an overall structure of a radio base station according to one embodiment of the present invention.

FIG. 14 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit and/or receive signals using multiple TTIs of different lengths (TTI durations). For example, in one or more carriers (cells, CCs, etc.), the transmitting/receiving sections 103 may receive signals using a first TTI (for example, a long TTI) and a second TTI (for example, a short TTI) with a shorter TTI duration than the first TTI.

For example, the transmitting/receiving sections 103 may receive UCI that is transmitted using a short PUCCH and/or a long PUCCH, from a user terminal 20.

The transmitting/receiving sections 103 may receive UCI using a short PUCCH in a frequency resource that does not overlap with the long PUCCH. The transmitting/receiving sections 103 may receive UCI that does not contain reference signals (for example, UCI demodulation reference signal) in a short PUCCH.

In addition, the transmitting/receiving sections 103 may transmit at least one of information about the PUCCH type, information about the performance and/or the quality required of UCI, information about the threshold for the number of HARQ retransmissions, which is for determining the PUCCH type, information about the UE category, information about the carrier's service type, information as to whether one UCI is transmitted or multiple UCIs are transmitted in long PUCCH and a short PUCCH, RS configuration information pertaining to a certain PUCCH type, information about the maximum number of UCI bits that can be transmitted, and information as to whether or not a sequence-based PUCCH is used in a long PUCCH and/or a short PUCCH, to the user terminal 20.

Figure 15:
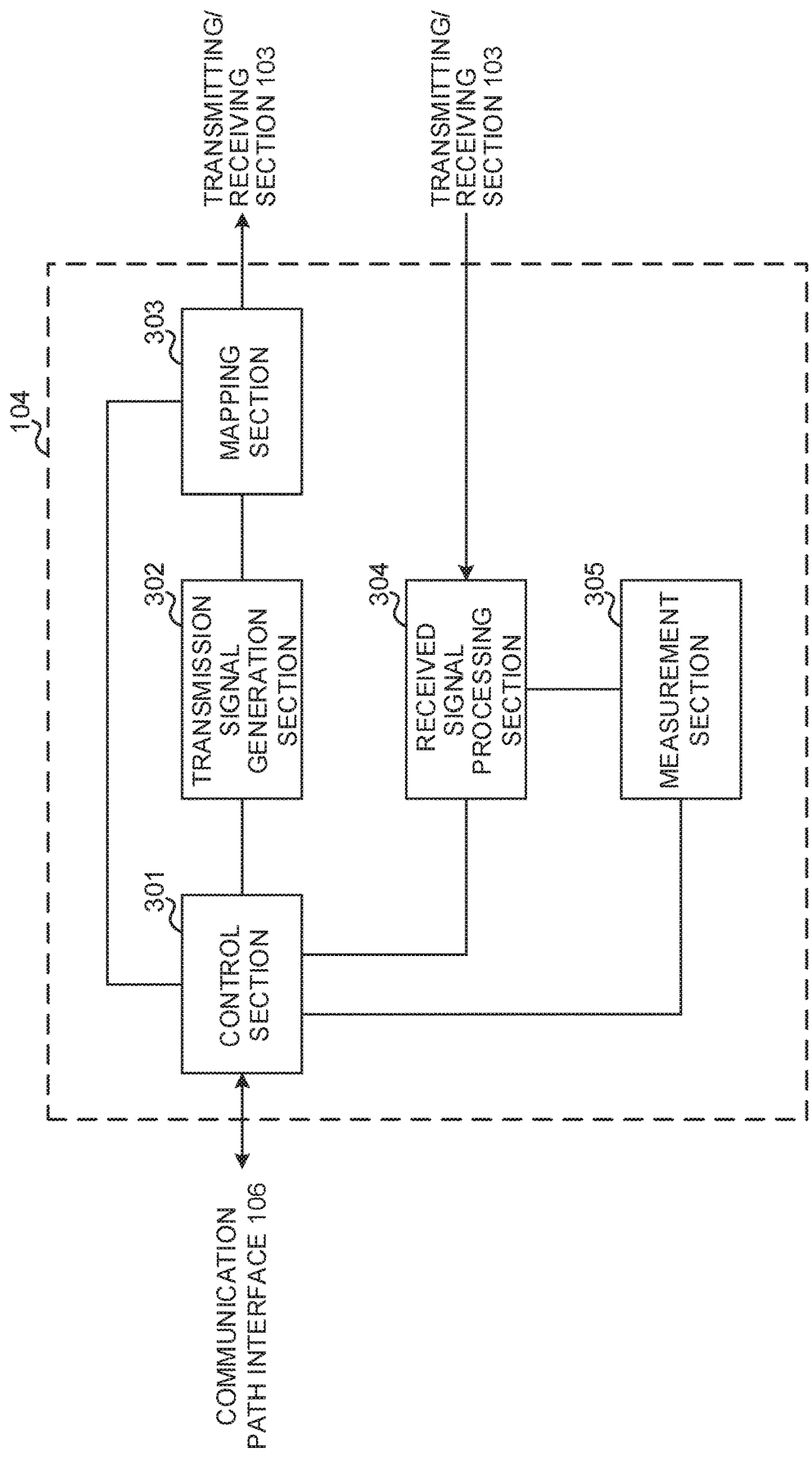
FIG. 15 is a diagram to show an example of a functional structure of a radio base station according to one embodiment of the present invention.

FIG. 15 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDSCH and/or the EPDCCH). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 may control the scheduling of uplink data signals (for example, signals transmitted in the PUSCH), uplink control signals (for example, signals transmitted in the PUCCH and/or the PUSCH, such as acknowledgment information), random access preambles (for example, signal transmitted by the PRACH), uplink reference signals and so on.

The control section 301 controls the transmission and/or reception of signals in one or more CCs by using a first TTI (for example, a long TTI, a subframe, a slot, etc.) and a second TTI (for example, a short TTI, an sTTI, a minislot, etc.) with a shorter TTI duration than the first TTI.

For example, the control section 301 may decide to use one or both of a short uplink control channel (short PUCCH), which is transmitted in a short period, and a long uplink control channel (long PUCCH), which is transmitted in a longer period than the short uplink control channel, to receive uplink control information (for example, UCI) that is transmitted from a certain user terminal 20, based on certain information.

Here, the certain information may be at least one of the size of the UCI, the type of the UCI, the number of times the UCI is retransmitted, and the UE category of the user terminal 20. Also, the certain information may be information about the PUCCH type, which indicates the combination of one or a plurality of PUCCHs that are used to transmit the UCI.

The control section 301 may control the receiving processes in the received signal processing section 304 for UCI transmitted in a short PUCCH and/or a long PUCCH. The control section 301 may control receiving processes on the assumption that the same UCI has been transmitted in the short PUCCH and the long PUCCH, for example, or may control receiving processes on the assumption that different (separate) UCIs have been transmitted.

The control section 301 may determine the RS configuration used in the short PUCCH and/or the long PUCCH.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

(User Terminal)

Figure 16:
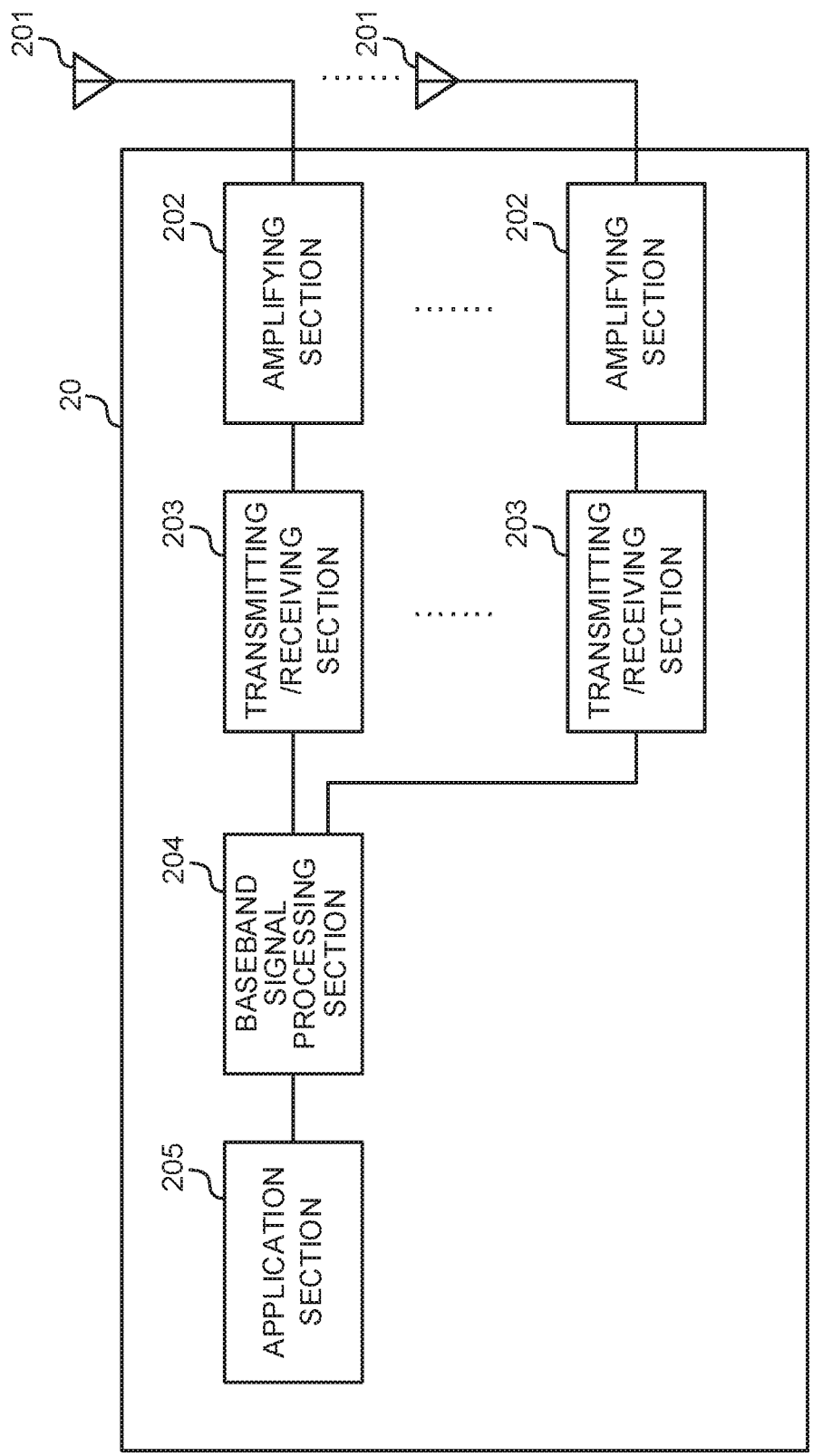
FIG. 16 is a diagram to show an example of an overall structure of a user terminal according to one embodiment of the present invention.

FIG. 16 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 may transmit and/or receive signals using multiple TTIs of different lengths (TTI durations). For example, in one or more carriers (cells, CCs, etc.), the transmitting/receiving sections 203 may transmit signals using a first TTI (for example, a long TTI) and a second TTI (for example, a short TTI) with a shorter TTI duration than the first TTI.

For example, the transmitting/receiving sections 203 may transmit UCI to the radio base station 10 using uplink control channels (for example, a short PUCCH and/or a long PUCCH), which are determined to be used for UCI transmission, by a control section 401, which will be described later.

When the control section 401, which will be described later, determines to use both a short PUCCH and a long PUCCH for UCI transmission, the transmitting/receiving sections 203 may transmit the same UCI over both the short PUCCH and the long PUCCH, or transmit different UCIs in each of the short PUCCH and the long PUCCH.

When the control section 401, which will be described later, determines to use both a short PUCCH and a long PUCCH for UCI transmission, the transmitting/receiving sections 203 may transmit the UCI, by using the short PUCCH, in frequency resources that do not overlap with the long PUCCH.

The transmitting/receiving sections 203 do not need to transmit reference signals (for example, UCI demodulation reference signal) in the short PUCCH, by virtue of the control section 401, which will be described later.

Also, the transmitting/receiving sections 203 may receive at least one of information about the PUCCH type, information about the performance and/or the quality required of UCI, information about the threshold for the number of HARQ retransmissions, which is for determining the PUCCH type, information about the UE category, information about the carrier's service type, information as to whether one UCI is transmitted or multiple UCIs are transmitted in long PUCCH and a short PUCCH, RS configuration information pertaining to a certain PUCCH type, information about the maximum number of UCI bits that can be transmitted, and information as to whether or not a sequence-based PUCCH is used in a long PUCCH and/or a short PUCCH, from the radio base station 10.

Figure 17:
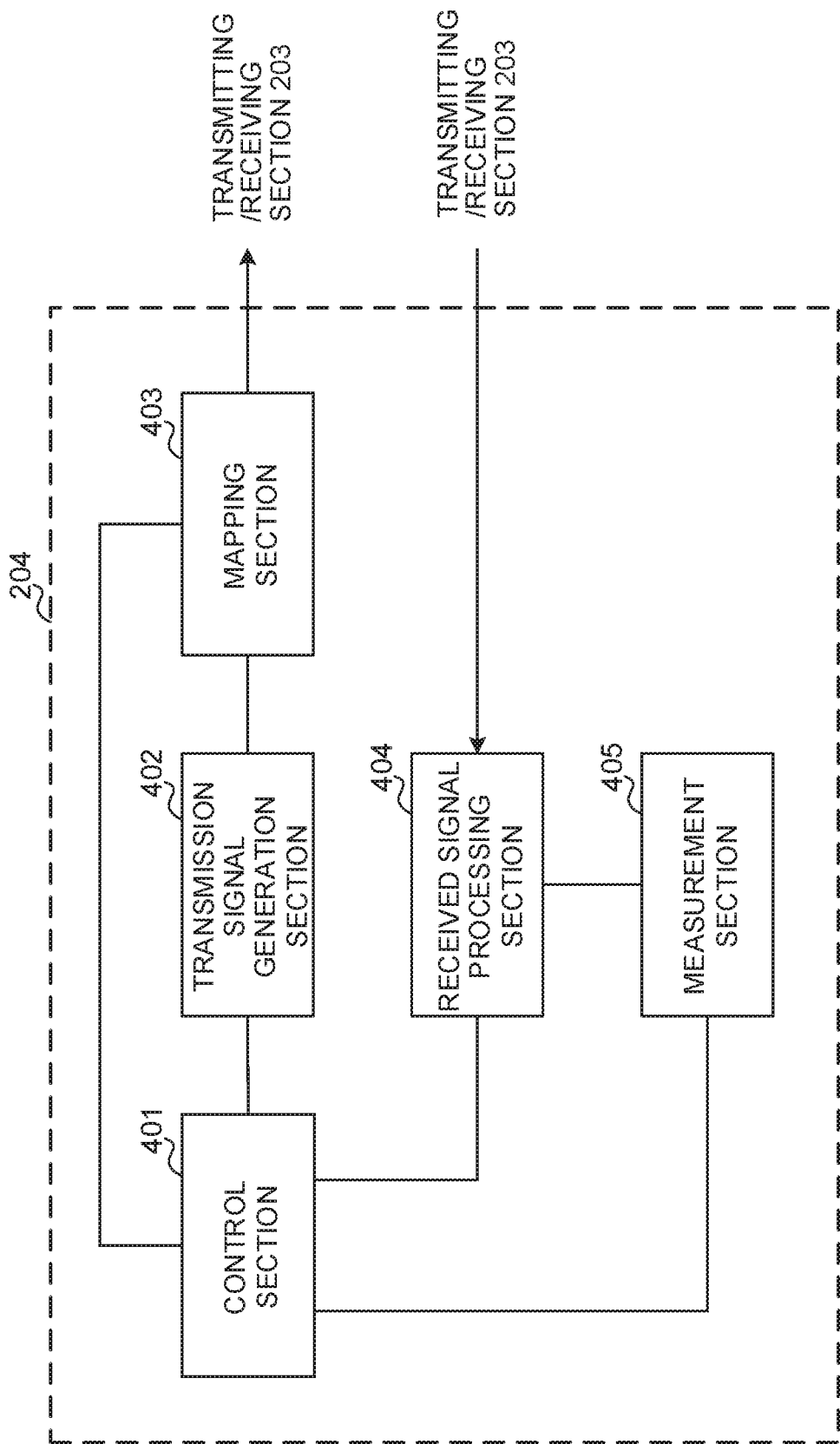
FIG. 17 is a diagram to show an example of a functional structure of a user terminal according to one embodiment of the present invention.

FIG. 17 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

In one or more CCs, the control section 401 controls the transmission and/or reception of signals using a first TTI (for example, a long TTI, a subframe, a slot, etc.) and a second TTI (for example, a short TTI, an sTTI, a minislot, etc.) having a shorter TTI duration than the first TTI.

For example, the control section 401 may decide to use one or both of a short uplink control channel (short PUCCH), which is transmitted in a short period, and a long uplink control channel (long PUCCH), which is transmitted in a longer period than the short uplink control channel, to transmit uplink control information (for example, UCI), based on certain information.

Here, the certain information may be at least one of the size of the UCI, the type of the UCI, the number of times the UCI is retransmitted, and the UE category of the user terminal 20. Also, the certain information may be information about the PUCCH type, which indicates the combination of one or a plurality of PUCCHs that are used to transmit the UCI.

The control section 401 may control generation and/or mapping of UCI that is transmitted in the short PUCCH and/or the long PUCCH. For example, the control section 401 may exert control to transmit the same UCI in a short PUCCH and a long PUCCH, or may exert control to transmit different (separate) UCIs.

The control section 401 may determine the PUCCH resources of the short PUCCH and/or the long PUCCH. In addition, the control section 401 may exert control to map UCI and RSs to PUCCH resources, or exert control not to map RSs (and map sequence-based PUCCH (UCI)).

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 18:
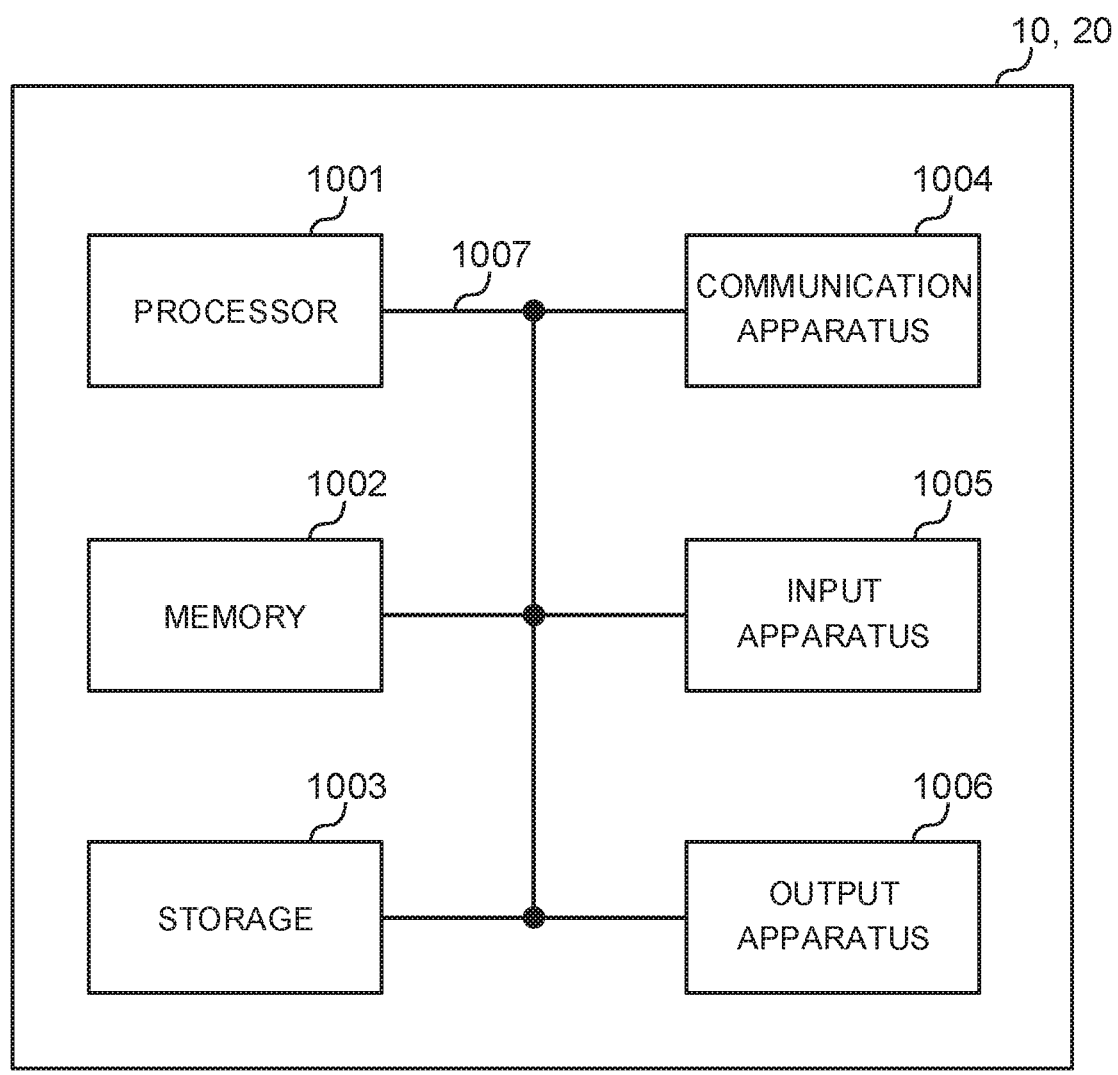
FIG. 18 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 18 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "carrier," a "carrier frequency" a "site," a "beam," and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to certain values, or may be represented in other information formats. For example, radio resources may be specified by certain indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-033355, filed on Feb. 24, 2017, including the specification, drawings and abstract, is incorporated herein by reference in its entirety.

The invention claimed is:

1. A terminal comprising:
a processor that determines to use, in a same slot, both of a first uplink control channel with one symbol or two symbols and a second uplink control channel that is transmitted in a longer period than two symbols, based on information to indicate that uplink control information (UCI) includes channel state information (CSI), the information being configured by radio resource control (RRC) signaling; and
a transmitter that transmits the UCI using the determined uplink control channel in the same slot,
wherein a number of symbols in the same slot is fourteen,
a format of the first uplink control channel is different from a format of the second uplink control channel,
the first uplink control channel does not overlap with the second uplink control channel, and
when both the first uplink control channel and the second uplink control channel are determined to be used in the same slot, the transmitter transmits different UCI over the first uplink control channel and the second uplink control channel.

2. A radio communication method for a terminal, comprising:
determining to use, in a same slot, both of a first uplink control channel with one symbol or two symbols and a second uplink control channel that is transmitted in a longer period than two symbols, based on information to indicate that uplink control information (UCI) includes channel state information (CSI), the information being configured by radio resource control (RRC) signaling; and
transmitting the UCI using the determined uplink control channel in the same slot,
wherein a number of symbols in the same slot is fourteen,
a format of the first uplink control channel is different from a format of the second uplink control channel,
the first uplink control channel does not overlap with the second uplink control channel, and
when both the first uplink control channel and the second uplink control channel are determined to be used in the same slot, the terminal transmits different UCI over the first uplink control channel and the second uplink control channel.

3. A system comprising:
a terminal that comprises:
a processor that determines to use, in a same slot, both of a first uplink control channel with one symbol or two symbols and a second uplink control channel that is transmitted in a longer period than two symbols, based on information to indicate that uplink control information (UCI) includes channel state information (CSI), the information being configured by radio resource control (RRC) signaling; and
a transmitter that transmits the UCI using the determined uplink control channel in the same slot,
wherein a number of symbols in the same slot is fourteen,
a format of the first uplink control channel is different from a format of the second uplink control channel,
the first uplink control channel does not overlap with the second uplink control channel, and
when both the first uplink control channel and the second uplink control channel are determined to be used in the same slot, the transmitter transmits different UCI over the first uplink control channel and the second uplink control channel, and
a base station that comprises:
a receiver that receives the UCI that is transmitted using the determined uplink control channel in the same slot.

4. The terminal according to claim 1, wherein, when both the first uplink control channel and the second uplink control channel are determined to be used in the same slot, the transmitter does not transmit a demodulation reference signal for the first uplink control channel.

* * * * *